(12) United States Patent
Grzesiak

(10) Patent No.: US 11,573,627 B2
(45) Date of Patent: Feb. 7, 2023

(54) METHOD OF CONTROLLING DEVICE AND ELECTRONIC DEVICE

(71) Applicant: Samsung Electronics Co., Ltd., Suwon-si (KR)

(72) Inventor: Grzegorz Pawel Grzesiak, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/750,751

(22) Filed: Jan. 23, 2020

(65) Prior Publication Data

US 2020/0233487 A1 Jul. 23, 2020

(30) Foreign Application Priority Data

Jan. 23, 2019 (KR) ........................ 10-2019-0008756

(51) Int. Cl.
*G06F 3/01* (2006.01)
*G06T 11/00* (2006.01)

(52) U.S. Cl.
CPC .............. *G06F 3/011* (2013.01); *G06F 3/017* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 9,182,819 B2 | 11/2015 | Strupczewski et al. | |
| 9,798,384 B2 | 10/2017 | Strupczewski et al. | |
| 2016/0026242 A1 | 1/2016 | Burns et al. | |
| 2016/0162020 A1 | 6/2016 | Lehman et al. | |
| 2016/0370882 A1 | 12/2016 | McGrath et al. | |
| 2017/0060230 A1 | 3/2017 | Faaborg et al. | |
| 2018/0095616 A1* | 4/2018 | Valdivia | G06F 3/017 |
| 2018/0120944 A1* | 5/2018 | Wang | G06F 1/163 |
| 2018/0210545 A1* | 7/2018 | Tuson | G02B 27/0093 |
| 2018/0321493 A1 | 11/2018 | Kim et al. | |
| 2018/0335838 A1 | 11/2018 | Cederlund et al. | |
| 2020/0169754 A1* | 5/2020 | Wang | H04N 19/184 |

FOREIGN PATENT DOCUMENTS

| | | |
|---|---|---|
| EP | 3 418 861 A1 | 12/2018 |
| JP | 2011-188147 A | 9/2011 |
| JP | 6002424 B2 | 10/2016 |
| KR | 10-1119896 B1 | 2/2012 |
| KR | 10-2015-0117553 A | 10/2015 |

(Continued)

OTHER PUBLICATIONS

International Search Report dated May 15, 2020, issued in International Application No. PCT/KR2020/001215.

(Continued)

*Primary Examiner* — Ifedayo B Iluyomade

(74) *Attorney, Agent, or Firm* — Jefferson IP Law, LLP

(57) ABSTRACT

An input of a command for controlling an electronic device is provided. The method of operating the electronic device includes determining at least one anchor point by designating a target to be controlled, based on a first input, identifying an operation to be performed for the target designated by the at least one anchor point, based on a second input, and performing the operation.

18 Claims, 29 Drawing Sheets

(56) References Cited

FOREIGN PATENT DOCUMENTS

| KR | 10-2017-0013737 A | | 2/2017 | |
|---|---|---|---|---|
| WO | 2015/081334 A1 | | 6/2015 | |
| WO | 2018/179749 A1 | | 10/2018 | |
| WO | WO2019013712 | * | 1/2019 | ........... H04N 13/122 |

OTHER PUBLICATIONS

Strupczewski et al., Head pose tracking from RGBD sensor based on direct motion estimation, Jun. 2015.
Strupczewski et al., Geometric eye gaze tracking, 11th Joint Conference on Computer Vision, Imaging and Computer Graphics Theory and Applications (VISIGRAPP 2016)—vol. 3: VISAPP, pp. 446-457.
ARCore for C API Reference, C API reference pages for the Google ARCore SDK, https://developers.google.com/ar/reference/c/?hl=en.
ARKit, Integrate iOS device camera and motion features to produce augmented reality experiences in your app or game, https://developer.apple.com/documentation/arkit.
Extended European Search Report dated Jan. 11, 2022, issued in European Patent Application No. 20746012.2-1216.

* cited by examiner

METHOD OF CONTROLLING DEVICE AND ELECTRONIC DEVICE

CROSS-REFERENCE TO RELATED APPLICATION(S)

This application is based on and claims priority under 35 U.S.C. § 119(a) of a Korean patent application number 10-2019-0008756, filed on Jan. 23, 2019, in the Korean Intellectual Property Office, the disclosure of which is incorporated by reference herein in its entirety.

BACKGROUND

1. Field

The disclosure relates to an electronic device. More particularly, the disclosure relates to a method of controlling an electronic device and the electronic device.

2. Description of Related Art

In general, a portable electronic device, such as a smart phone includes a touch screen as an input means. The touch screen is able to intuitively interact with a user in that the user can make an input on a screen. However, the size of an area for making a touch input may be limited according to the size of the electronic device in which case the accuracy of the touch input using a finger may have limits. Further, in the case of services based on a technology, such as Virtual Reality (VR) or Augmented Reality (AR), there is no means for the touch input or the touch input may be made beyond a user's sight.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for inputting a command for more effectively controlling a device.

Another aspect of the disclosure is to provide a method and an electronic device for controlling a device using other means as well as a touch input.

Another aspect of the disclosure is to provide a method and an electronic device for controlling a device through a voice, an eye gaze, or a gesture in a wireless communication system.

Another aspect of the disclosure is to provide a method and an electronic device for controlling an object displayed on a device through a voice, an eye gaze, or a gesture in a wireless communication system.

Additional aspects will be set forth in part in the description which follows and, in part, will be apparent from the description, or may be learned by practice of the presented embodiments.

In accordance with an aspect of the disclosure, a method performed by an electronic device is provided. The method includes determining at least one anchor point by designating a target to be controlled, based on a first input, identifying an operation to be performed for the target designated by the at least one anchor point, based on a second input, and performing the operation.

In accordance with another aspect of the disclosure, an electronic device is provided. The electronic device includes a detector configured to detect a state inside or outside the electronic device and at least one processor connected to the detector. The at least one processor may determine at least one anchor point by designating a target to be controlled based on a first input identified by the detector, identify an operation to be performed for the target designated by the at least one anchor point based on a second input identified by the detector, and perform the operation.

A method and an electronic device according to various embodiments of the disclosure can input a command for controlling a device using a voice, an eye gaze, and a gesture, thereby more easily controlling the device.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
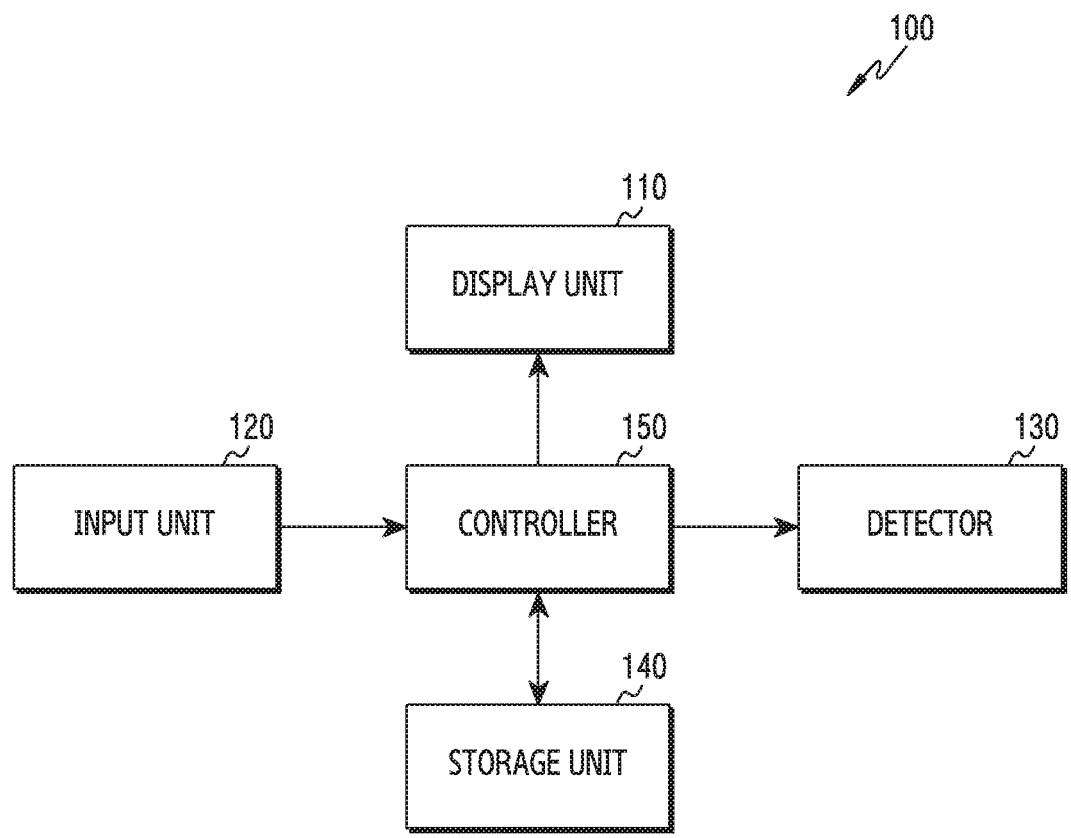
FIG. 1 is a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure provides a method of controlling a device and an electronic device therefor. Specifically, the disclosure describes a technology for inputting a command for controlling a device by making various types of inputs, such as a voice, an eye gaze, and a gesture into an electronic device.

The terms referring to a control target used by an electronic device in the following description, the terms referring to a state of the control target, the terms referring to a user's gesture, and the terms referring to an element of a device are mentioned for convenience of description. Accordingly, the disclosure is not limited to the following terms and other terms having the same technical meaning may be used.

Further, the expression "larger than" or "smaller than" is used to determine whether a specific condition is satisfied or fulfilled, but is only to indicate an example and does not exclude "larger than or equal to" or "equal to or smaller than" A condition indication "larger than or equal to" may be replaced with a condition indicating "larger than", a condition indicating "equal to or smaller than" may be replaced with "smaller than", and a condition indicating "larger than or equal to and smaller than" may be replaced with "larger than and smaller than".

FIG. 1 is a block diagram of an electronic device according to an embodiment of the disclosure.

Referring to FIG. 1, an electronic device 100 includes a display unit 110, an input unit 120, a detector 130, a storage unit 140, and a controller 150.

The display unit 110 visually outputs graphics and/or characters. The display unit 110 may visually provide information to the outside (for example, a user) according to the control of the controller 150. For example, the display unit 110 may include a display, a hologram device, or a projector, and a control circuit for controlling the corresponding device. For example, the display unit 110 may include at least one of a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED). Further, in order to provide a Virtual Reality (VR) or Augmented Reality (AR) service, the electronic device 100 may include an optical member (for example, a lens) when the electronic device 100 is a head-mounted type or a glass type.

The input unit 120 detects an input from the outside (for example, the user). For example, the input unit 120 may identify a command or data to be used by an element of the electronic device 100 from the outside (for example, the user) of the electronic device 100. The input unit 120 may include, for example, a microphone, a mouse, a keyboard, a keypad, a button, a touch pad, or a digital pen (for example, a stylus pen). According to an embodiment, the input unit 120 and the display unit 110 may be configured as a single module. In this case, the input unit 120 may be a touch circuitry or a touch panel for detecting a touch, and the display unit 110 and the input unit 120 may configure a touch screen.

The detector 130 detects a state of the inside or the outside of the electronic device 100. In other words, the detector 130 generates a signal or data corresponding to the state of the inside or the outside of the electronic device 100. The detector 130 may include hardware for generating an electric signal in response to a physical change (for example, light, magnetic field, gravity, and temperature). For example, the detector 130 may include at least one of a camera, a gravity sensor, a gyro sensor, an acceleration sensor, a gesture sensor, a proximity sensor, a color sensor, an infrared sensor, a biometric sensor, a humidity sensor, and an illumination sensor.

The storage unit 140 may store various pieces of data used by at least one element of the electronic device 100. The data may include, for example, software and input data or output data related thereto. The storage unit 140 may include volatile memory or nonvolatile memory.

The controller 150 controls the overall operation of the electronic device 100. For example, the controller 150 may control at least one other element (for example, a hardware or software element) of the electronic device 100 connected to the controller 150 by executing software and perform various data processing or calculations. According to an embodiment, as at least a portion of the data processing or calculations, the controller 150 may load a command or data from another element to the storage unit 140, process the command or data stored in the storage unit 140, and store resultant data in the storage unit 140. To this end, the controller 150 may include a main processor (for example, a central processing unit or an application processor) and an auxiliary processor (for example, a graphic processing unit, an image signal processor, a sensor hub processor, or a communication processor) that can operate independently or together therewith.

According to various embodiments, the controller 150 may recognize a user's command input through various types and control the electronic device 100. For example, the user's command may be input through various types, such as a touch input, an eye gaze, a voice, and a gesture. The user's command may include an object to apply the command and the content of the command and may be specified by two or more schemes. According to various embodiments, the controller 150 may control the electronic device 100 to perform operations according to the following various embodiments.

The electronic device may interact with the user. For example, the user may provide a command through an input means (for example, the input unit 120) included in the electronic device, and the electronic device may perform a function corresponding to the command. In general, a touch screen is widely used as the input means.

However, it is not easy to control a complex application through the touch input alone. For example, when an image editing application is used in a mobile environment, very accurate and delicate control is not easy due to the size of the screen and the accuracy of a finger gesture. In most cases, an application function does not depend on the screen size, and available characteristics are the same in 3-inch, 5-inch, and tablet devices. In many cases, a television (TV) has the same characteristic and is controlled in the same way as small mobile devices.

The electronic device may be used for the VR or AR service in a head-mounted type or a glass type in which case a touch cannot be generally used. For example, in the case of VR or AR, a display unit (for example, the display unit 110) of the electronic device is very close to eyes, so that the user may not use a touch screen of the electronic device to control the screen (scene).

As described above, when controlling the electronic device, there are limits on the control due to the screen size, the size of fingertips, a lack of the touch screen, or an impossibility of the use of the touch screen. Accordingly, the disclosure proposes various embodiments of more effectively controlling the electronic device.

Figure 2:
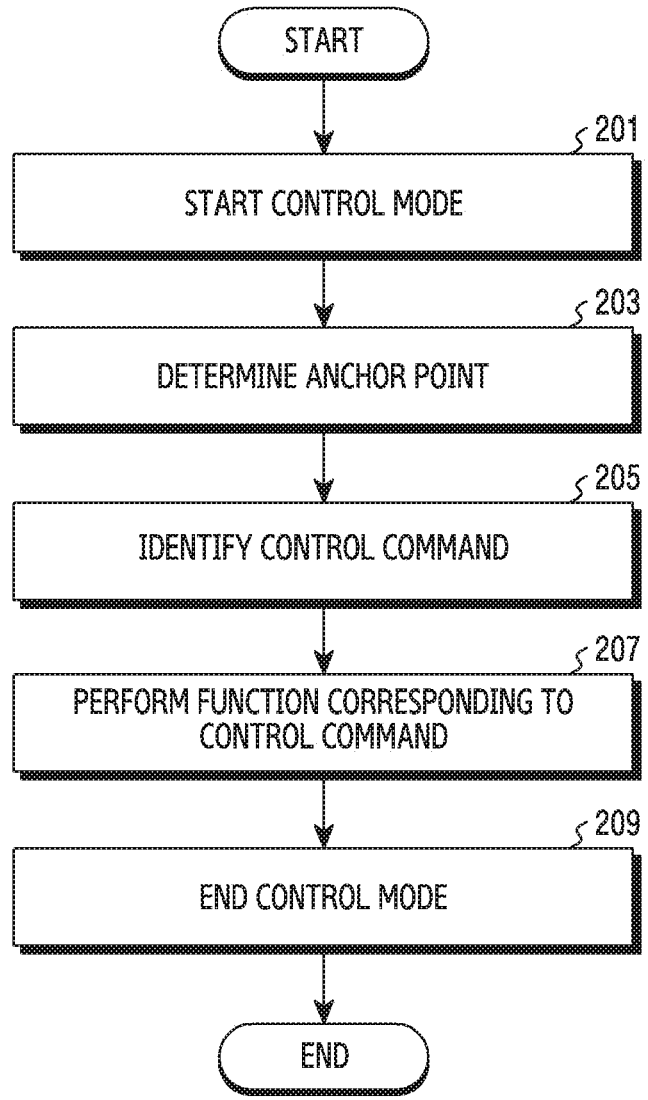
FIG. 2 is a flowchart illustrating an operation of an electronic device according to an embodiment of the disclosure.

FIG. 2 is a flowchart illustrating an operation of an electronic device according to an embodiment of the disclosure. FIG. 2 illustrates a method of operating the electronic device 100.

Referring to FIG. 2, in operation 201, the electronic device starts a control mode. The control mode is a mode in which the electronic device can be controlled based on inputs in two or more forms. According to various embodiments, the control mode may be started, entered, or activated by a predefined start command. For example, the start command may be defined based on an input in at least one form. Specifically, the start command may be defined as a voice having the predetermined content or a button input in a predefined pattern. The start command may be referred to as a "start action" or another term having a technical meaning equivalent thereto.

In operation 203, the electronic device determines an anchor point. The anchor point is an object in a virtual world or a real world displayed on the electronic device or one point on an object existing in a real world and is used to designate a target, to which a function to be performed later is applied, that is, a target to be controlled in the control mode. For example, the target to be controlled may be one of an object, a specific point of the object, a space, and a specific location of the space. According to various embodiments, the anchor point may be determined based on an input in at least one form. For example, the input in at least one form may include at least one of voice detection (for example, a linguistic meaning of a voice, a voice tone, and a voice pitch), eye gaze tracking (for example, a location which an eye gaze faces or a time during which an eye gaze is maintained), a touch input (for example, a touch position, a touch type, a touch time, or a touch pattern), and a button input (for example, a button type, a press time, or a press pattern). According to an embodiment, an input for determining the anchor point may be defined or detected jointly with the start command.

In operation 205, the electronic device identifies the control command. The control command indicates an operation to be performed for a target designated by the anchor point. According to various embodiments, the control command may be identified based on an input in at least one form. For example, the input in at least one form may include at least one of a gesture (for example, hand movement, eye blink, facial expression, head rotation, body movement, or a change in a position of the electronic device), voice detection (for example, a linguistic meaning of a voice, a voice tone, or a voice pitch), gaze tracking (for example, a location which an eye gaze faces or a time during which an eye gaze is maintained), a touch input (for example, the number of touch inputs or a pattern of a touch input), and a button input. According to an embodiment, the input in one form may be used to identify a function type (for example, rotation, movement, stretching/pulling, or change), and the input in the other form may be used to identify a parameter of the function (for example, a direction of rotation, a direction of movement, a direction and a degree of stretching/pulling, and a degree of a change).

In operation 207, the electronic device performs a function corresponding to the control command. The content of the control command depends on an object designated by the anchor point, a control command detected after the anchor point is determined, and a currently executed application. The function corresponding to the control command may be performed based on the anchor point or performed for the object designated by the anchor point.

In operation 209, the electronic device ends the control mode. According to an embodiment, the control mode may be ended or released by a predefined end command. For example, the end command may be defined based on an input in at least one form. Specifically, the end command may be defined as a voice having the predefined content or a touch/button input in a predefined pattern. The end command may be referred to as an "end action" or another term having a technical meaning equivalent thereto. According to another embodiment, the control mode may be ended by the lapse of a predetermined time from the entry into the control mode or the lapse of a predetermined time after generation of the control command.

Referring to FIG. 2, the electronic device may perform a corresponding function through various types of inputs during the control mode. In order to recognize various types of inputs, a capability for detecting a touch, a voice, a gesture, or an eye gaze may be needed. Specifically, various types of inputs may include at least one of a finger (for example, an operation for an image, such as the size control, a displayed three-dimensional (3D) object or an avatar, or an operation for a business application within a VR scene or an Excel file), eye gaze and additional input information (for example, the eye gaze can be tracked by a built-in camera), and head tracking (for example, movement or rotation). Rotation of the head which can be detected by head tracking may be as illustrated in FIG. 3 below.

Figure 3:
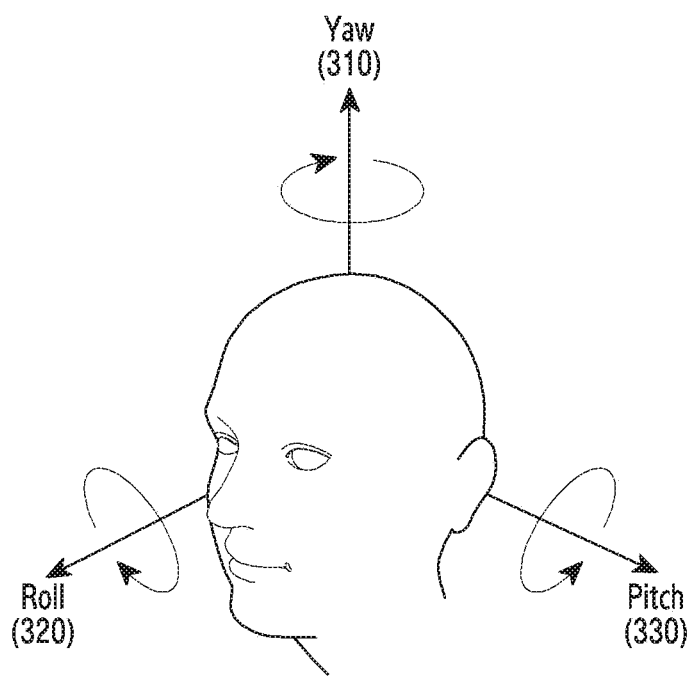
FIG. 3 illustrates a head movement which can be detected by an electronic device according to an embodiment of the disclosure.

FIG. 3 illustrates a head movement which can be detected by an electronic device according to an embodiment of the disclosure.

Referring to FIG. 3, rotation of the head with respect to an axis facing upwardly is defined as yaw 310, rotation with respect to an axis toward the face is defined as roll 320, and rotation with respect to an axis facing the lateral side of the face is defined as pitch 330. The rotation of the head may be tracked based on an image captured by the built-in camera or based on a measurement value of another sensor (for example, a gyro sensor or an Inertial Navigation System (INS)).

Figure 4A:
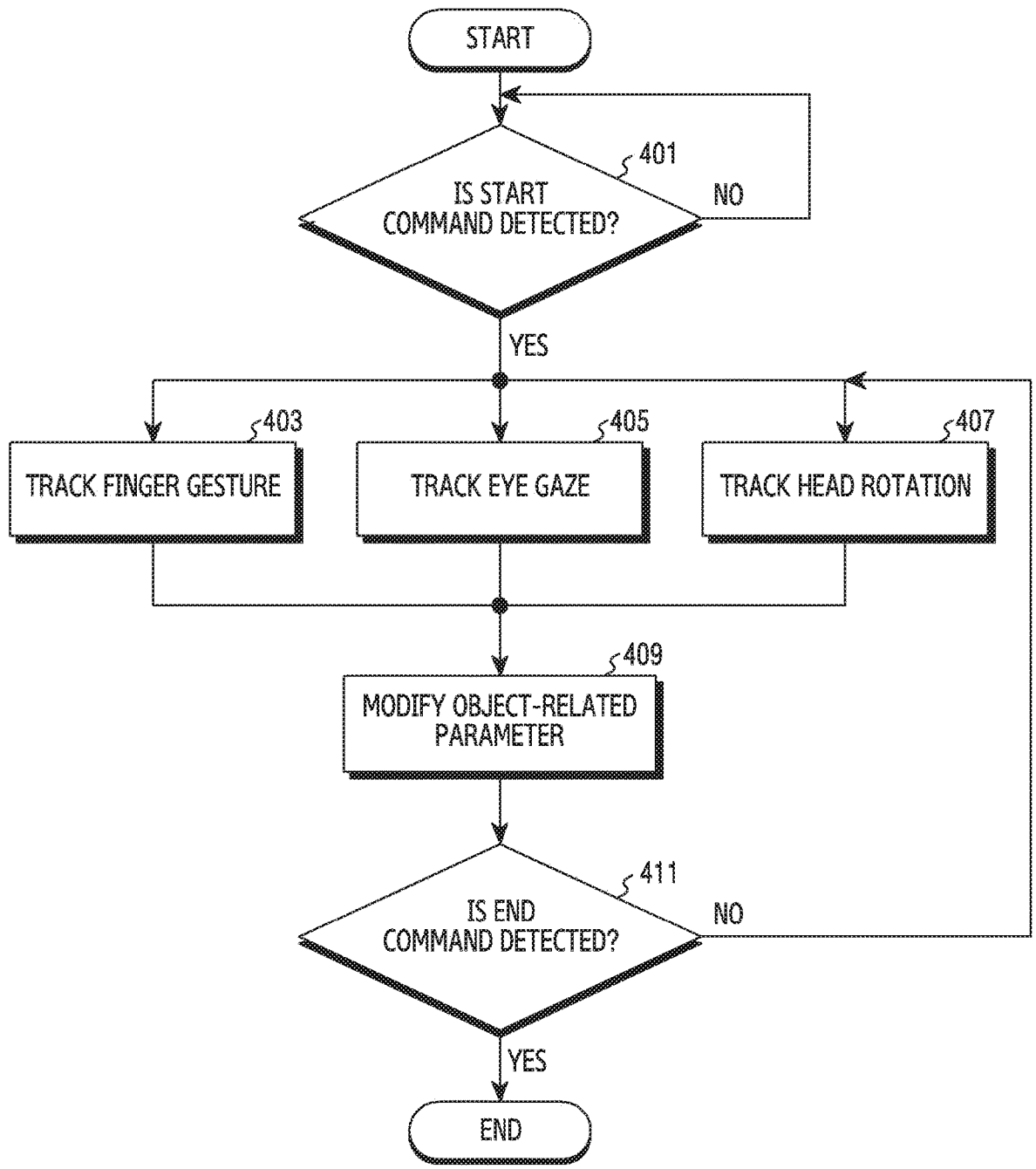
FIG. 4A is a flowchart illustrating a process in which an electronic device modifies a parameter related to an object based on various types of inputs according to an embodiment of the disclosure.

FIG. 4A is a flowchart illustrating a process in which an electronic device modifies a parameter related to an object based on various types of inputs according to an embodiment of the disclosure. FIG. 4A illustrates a method of operating the electronic device 100.

Figure 4B:
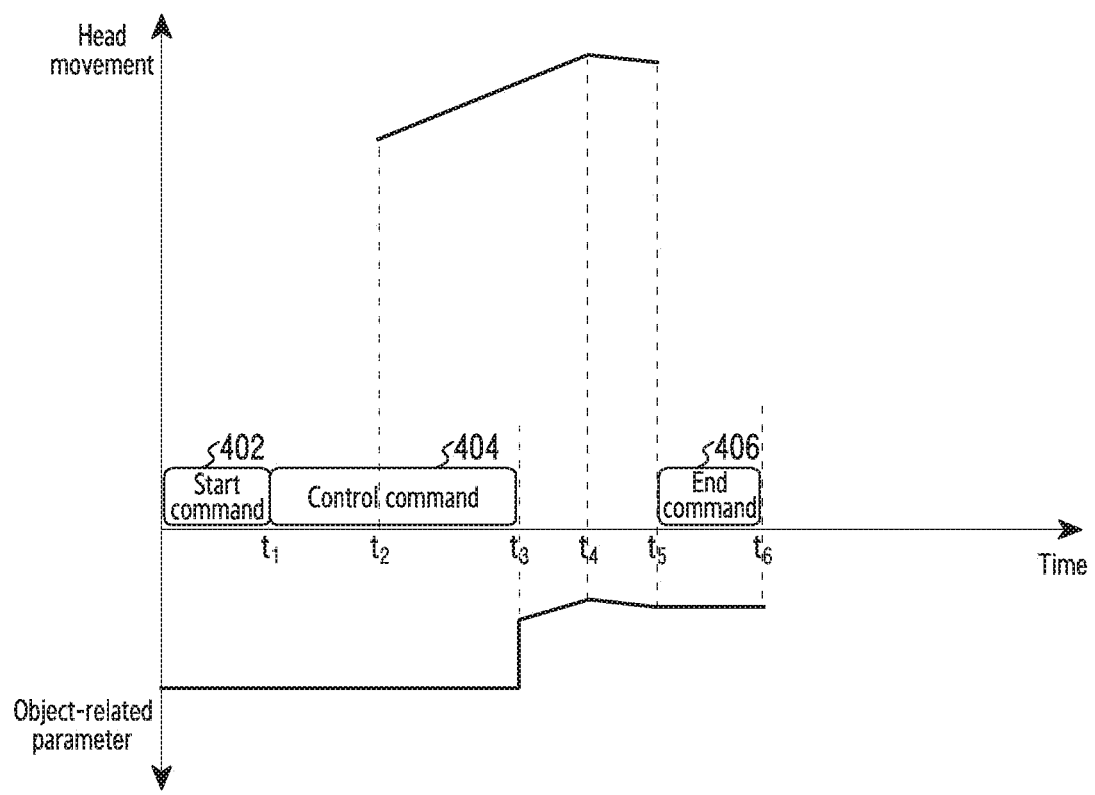
FIG. 4B illustrates a change in a head movement and an object-related parameter according to a lapse of time in an electronic device according to an embodiment of the disclosure.

FIG. 4B illustrates a change in a head movement and an object-related parameter according to a lapse of time in an electronic device according to an embodiment of the disclosure.

Referring to FIG. 4A, in operation 401, the electronic device identifies whether a start command is detected. According to an embodiment, the user may use a voice command in order to turn on a control mode. For example, referring to FIG. 4B, a start command 402 may be detected at a time point $t_2$.

The electronic device tracks a finger gesture in operation 403. The electronic device tracks an eye gaze in operation 405. The electronic device tracks head rotation in operation 407. The electronic device may determine an anchor point through operations 403, 405, and 407. According to an embodiment, the anchor point may be identified by tracking one point of an object or an eye gaze at an object to be controlled. The anchor point may be determined once during the overall procedure or continuously determined. According to an embodiment, the electronic device may determine a control command based on the finger gesture or the head rotation. Although not illustrated in FIG. 4A, another type of the input (for example, a voice, a button, or a facial expression) may be further used to determine the control command. For example, referring to FIG. 4B, a control command 404 may be identified by head movement starting at a time point $t_2$.

In operation 409, the electronic device modifies a parameter related to the object. According to an embodiment, the electronic device may modify the parameter related to the object based on a finger or head location. For example, referring to FIG. 4B, the parameter related to the object may be modified from a time point $t_3$ based on a control command 404 generated at the time point $t_1$ and head movement detected from the time point $t_2$. Thereafter, when an amount of the change in head movement is changed at a time point $t_4$ and a time point $t_5$, an amount of the change in the parameter may also be changed.

In operation 411, the electronic device detects an end command. Accordingly, the control mode is terminated. The user may use a voice command for turning off the control mode. For example, referring to FIG. 4B, an end command 406 may be generated between the time point $t_5$ and a time point $t_6$. Accordingly, after the time point $t_6$, the head movement may be analyzed and processed according to a rule defined in a mode other than the control mode.

The operations described with reference to FIG. 4A may be sequentially performed. According to another embodiment, some operations may be performed in parallel. For example, measurement of eye gaze tracking and/or tracking of the head location may be performed before the control mode starts. According to another embodiment, at least one operation may be omitted or replaced. For example, the voice command may be replaced with another input for turning on/off.

As described above, the electronic device according to various embodiments may designate an object based on various types of inputs and control the designated object. The object may be one of content, attributes of the content, an application, a parameter related to the application, and an element of the electronic device. Various embodiments may be derived by selecting various types of inputs described in the above embodiment for each operation. Hereinafter, the disclosure describes more detailed embodiments. In the following embodiments, the description of the start command and the end command is omitted but it is apparent that the operation for starting and ending the control mode by the start command and the end command may be further performed.

Figure 5:
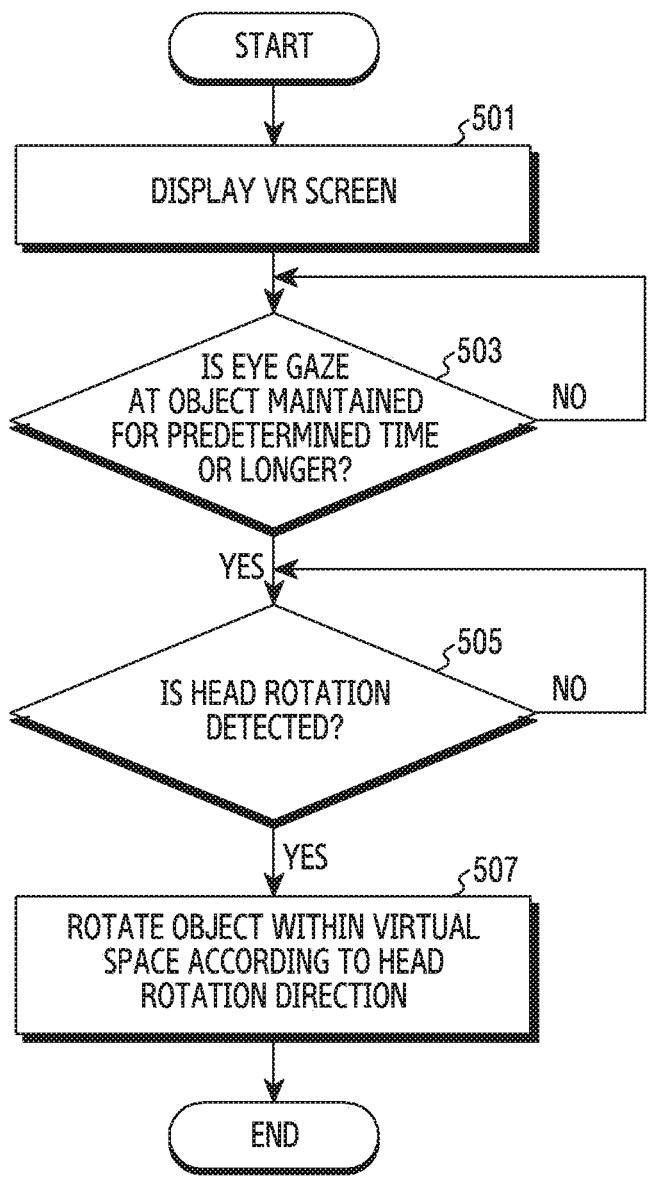
FIG. 5 is a flowchart illustrating a process in which an electronic device controls an object within a virtual space based on an eye gaze and head rotation according to an embodiment of the disclosure.

FIG. 5 is a flowchart illustrating a process in which an electronic device controls an object within a virtual space based on an eye gaze and head rotation according to an embodiment of the disclosure. FIG. 5 illustrates a method of operating the electronic device 100.

Referring to FIG. 5, in operation 501, the electronic device displays a VR screen. The electronic device may display a VR screen in the state in which the electronic device is equipped with an auxiliary device (for example, headset). The VR screen may include at least one object (for example, virtual model).

In operation 503, the electronic device identifies whether an eye gaze at an object is maintained for a predetermined time or longer. The electronic device tracks an eye gaze of the user through a camera and identifies whether the eye gaze at a specific object is maintained for a predetermined time or longer, in other words, the time for which the eye gaze at the specific object is maintained is larger than a threshold value according to the tracking result. Whether the eye gaze is maintained may be determined based on the entire surface of the object or based on a partial area on the object. When the eye gaze at the object is maintained for a predetermined time or longer, one point on the surface of the corresponding object or inside the corresponding object or one nearby point may be determined as an anchor point.

When the eye gaze at the object is maintained for a predetermined time or longer, the electronic device identifies whether head rotation is detected in operation 505. The head rotation may be identified by three components, such as yaw, pitch, and roll. The electronic device may detect head rotation through a camera or a sensor.

When the head rotation is detected, the electronic device rotates the object within the virtual space according to a rotation direction of the head in operation 507. The electronic device rotates the object based on the anchor point. At this time, the electronic device may rotate the object in a direction, which is the same as the direction of head rotation or a direction obtained by converting the direction of head rotation according to a predefined rule. According to another embodiment, the anchor point may be continuously changed. For example, the anchor point may be periodically determined based on a point which the eye gaze faces.

In the embodiment described referring to FIG. 5, the electronic device displays the VR screen and then identifies whether the eye gaze at the object is maintained for a predetermined time or longer. According to another embodiment, when a start command is detected after the VR screen is displayed, the electronic device may perform operation 503. In this case, if there is no start command, the electronic device may analyze the head rotation as a navigation command. According to an embodiment, the electronic device may deactivate a navigation function according to the start command and analyze the head rotation as an object rotation command. According to another embodiment, the electronic device may analyze only some of the three components (for example, yaw, pitch, and roll) included in the head rotation as the object rotation command and analyze the remaining components are the navigation command. A method related to the start command may be applied to another embodiment.

When the start command is used, intervals in which the maintenance of the eye gaze can be recognized may be variously defined. According to an embodiment, the maintenance of the eye gaze within an interval before the start command may be excluded from the comparison with a threshold value. According to another embodiment, the maintenance of the eye gaze within the interval before the start command may be considered when compared with the threshold value. In this case, the time for which the eye gaze is maintained may include a time before and after the start command. For example, the electronic device may identify a start point of the time for which the eye gaze is maintained within an interval after the start command or identify the same within an interval including a time before the start command. A method related to the start command may be applied to another embodiment.

Figure 6A:
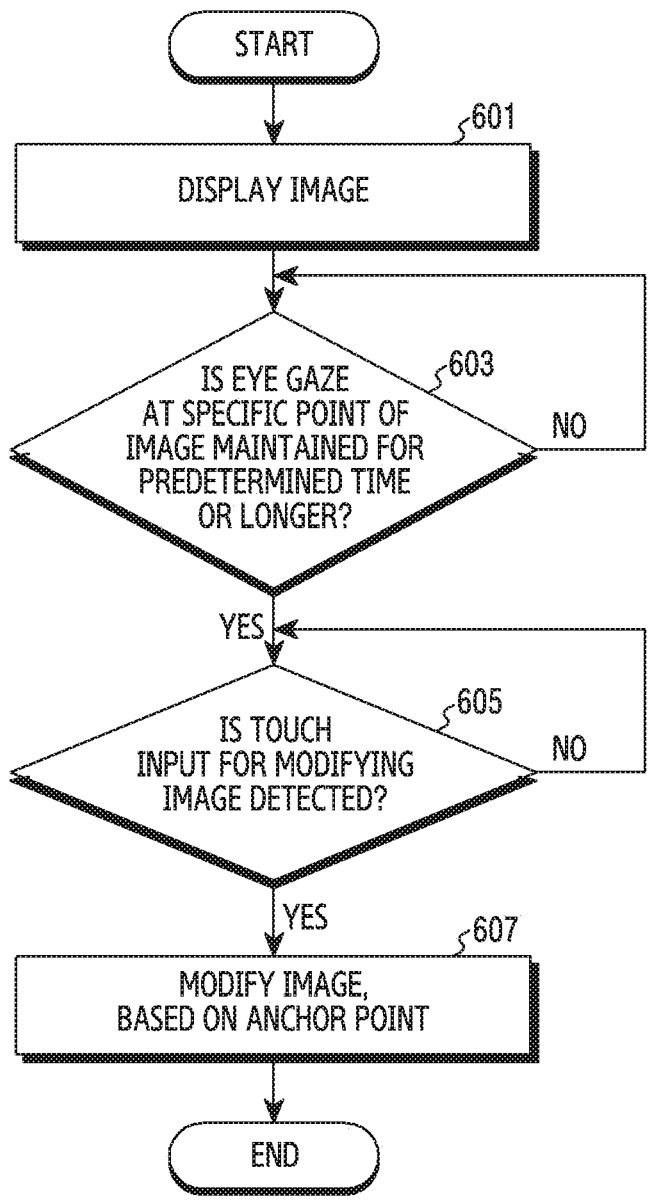
FIG. 6A is a flowchart illustrating a process in which an electronic device modifies an image based on an eye gaze and a touch input according to an embodiment of the disclosure.

FIG. 6A is a flowchart illustrating a process in which an electronic device modifies an image based on an eye gaze and a touch input according to an embodiment of the disclosure. FIG. 6A illustrates a method of operating the electronic device 100.

Figure 6B:
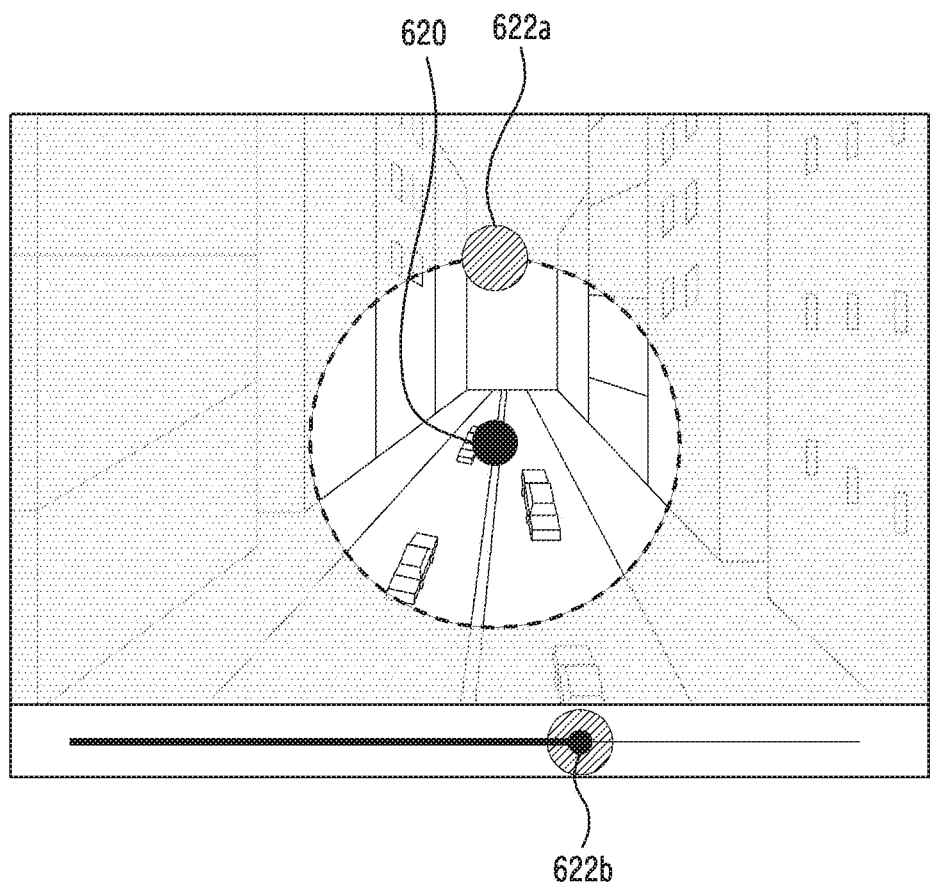
FIG. 6B illustrate images modified using an eye gaze and a touch input in an electronic device according to an embodiment of the disclosure.

FIG. 6B illustrate images modified using an eye gaze and a touch input in an electronic device according to an embodiment of the disclosure.

Referring to FIG. 6A, in operation 601, the electronic device displays at least one image. For example, the electronic device may execute an image editing application and display at least one image.

In operation 603, the electronic device identifies whether an eye gaze at a specific point of the image is maintained for a predetermined time or longer. The electronic device tracks the eye gaze of the user through the camera and identifies whether the eye gaze at a specific point is maintained for a predetermined time or longer, in other words, the time for which the eye gaze at the specific point is larger than a threshold value according to the tracking result. When the eye gaze at the specific point is maintained for a predetermined time or longer, the corresponding point may be determined as an anchor point.

When the eye gaze at the specific point is maintained for a predetermined time or longer, the electronic device identifies whether a touch input for modifying the image is detected in operation 605. For example, image modification may be rotation, size control, stretching/pulling, distortion, filtering (or blurring) or another editing function.

When the touch input for the image modification is detected, the electronic device may modify the image based on the anchor point in operation 607. For example, when a blurring effect is provided, the electronic device may form a boundary at a point at which a touch input 622a of the user is detected and blur an area outside the boundary based on the anchor point 620 as illustrated in FIG. 6B. Alternatively, the electronic device may control a slide bar based on the touch input 622b of the user, determine a distance between the boundary and the anchor point 620 according to a state of the slide bar, and then blur the area outside the boundary based on the anchor point 620. In another example, when image stretching/pulling is performed, the electronic device may move corners of the original image to points at which touch inputs 632a, 632b, 632c, and 632d are generated based on the anchor point 620 as illustrated in FIG. 6C.

In the embodiment described referring to FIG. 6A, the anchor point is determined by maintenance of an eye gaze at a specific point for a predetermined time or longer. According to another embodiment, the anchor point may be determined by a voice command without any determination about whether the eye gaze is maintained for a predetermined time. For example, when the user gazes at a specific point and makes a predefined voice command (for example, "Fix!"), the electronic device may determine a point at which the user gazes when the voice command is generated as the anchor point. A method of determining the anchor point based on the eye gaze and the voice command may be applied to another embodiment.

Figure 7A:
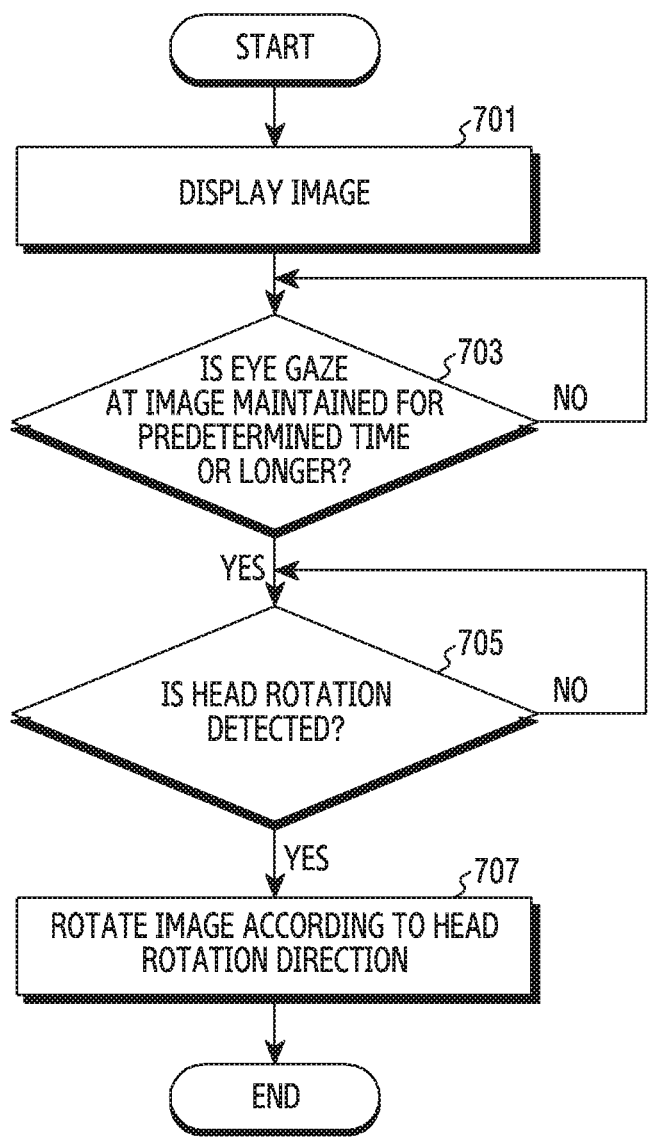
FIG. 7A is a flowchart illustrating a process in which an electronic device rotates an image based on an eye gaze and a touch input according to an embodiment of the disclosure.

FIG. 7A is a flowchart illustrating a process in which an electronic device rotates an image based on an eye gaze and a touch input according to an embodiment of the disclosure. FIG. 7A illustrates a method of operating the electronic device 100.

Figure 7B:
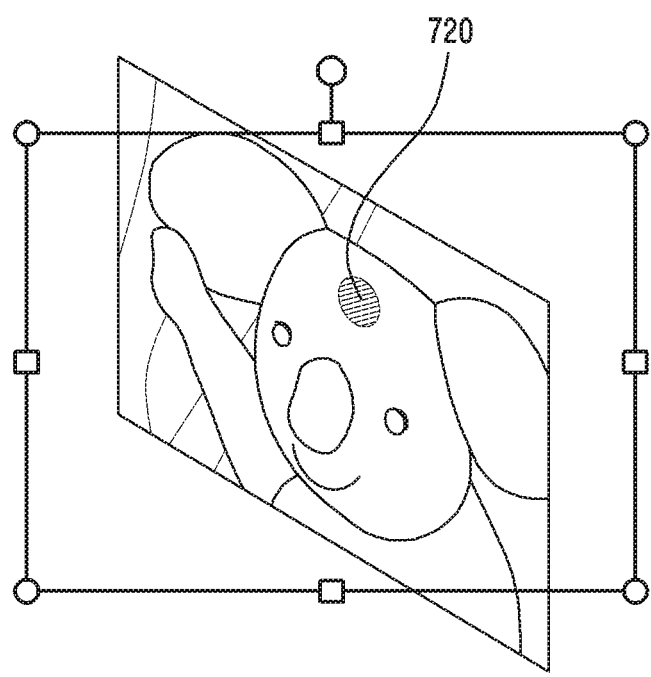
FIG. 7B illustrates an image rotated using an eye gaze and a touch input in an electronic device according to an embodiment of the disclosure.

FIG. 7B illustrates an image rotated using an eye gaze and a touch input in an electronic device according to an embodiment of the disclosure.

Referring to FIG. 7A, in operation 701, the electronic device displays at least one image. For example, the electronic device may execute an application related to the image (for example, an image display application or an image editing application) and display at least one image.

In operation 703, the electronic device identifies whether an eye gaze at a specific point of the image is maintained for a predetermined time or longer. The electronic device tracks the eye gaze of the user through the camera and identifies whether the eye gaze at a specific point is maintained for a predetermined time or longer, in other words, the time for which the eye gaze at the specific point is larger than a threshold value according to the tracking result. When the eye gaze at the specific point is maintained for a predetermined time or longer, the corresponding point may be determined as an anchor point.

When the eye gaze at the specific point is maintained for a predetermined time or longer, the electronic device identifies whether head rotation is detected in operation 705. The head rotation may be identified by three components, such as yaw, pitch, and roll. The electronic device may detect head rotation through a camera or a sensor.

When head rotation is detected, the electronic device rotates the image according to a head rotation direction in operation 707. For example, the electronic device analyzes the head rotation as an image rotation command. For example, when the eye gaze of the user is maintained at a point 720 for a predetermined time or longer and then the user rotates the head as illustrated in FIG. 7B, the image may be rotated according to a head rotation direction. At this time, a reference point of the rotation may be a predefined point or a point (for example, the point 720) determined by the eye gaze of the user. When the reference point is determined by the eye gaze of the user, the reference point may be determined when the image is selected (for example, in operation of operation 703) or determined by an eye gaze direction after the image is specified.

In the embodiment described referring to FIG. 7A, the image is rotated according to head rotation. According to another embodiment, the head rotation may be replaced with a voice command. For example, when the user makes a voice command (for example, "Rotate left!", "Rotate up!") for rotating the image, the electronic device may detect a direction included in the voice command and rotate the image.

Figure 8:
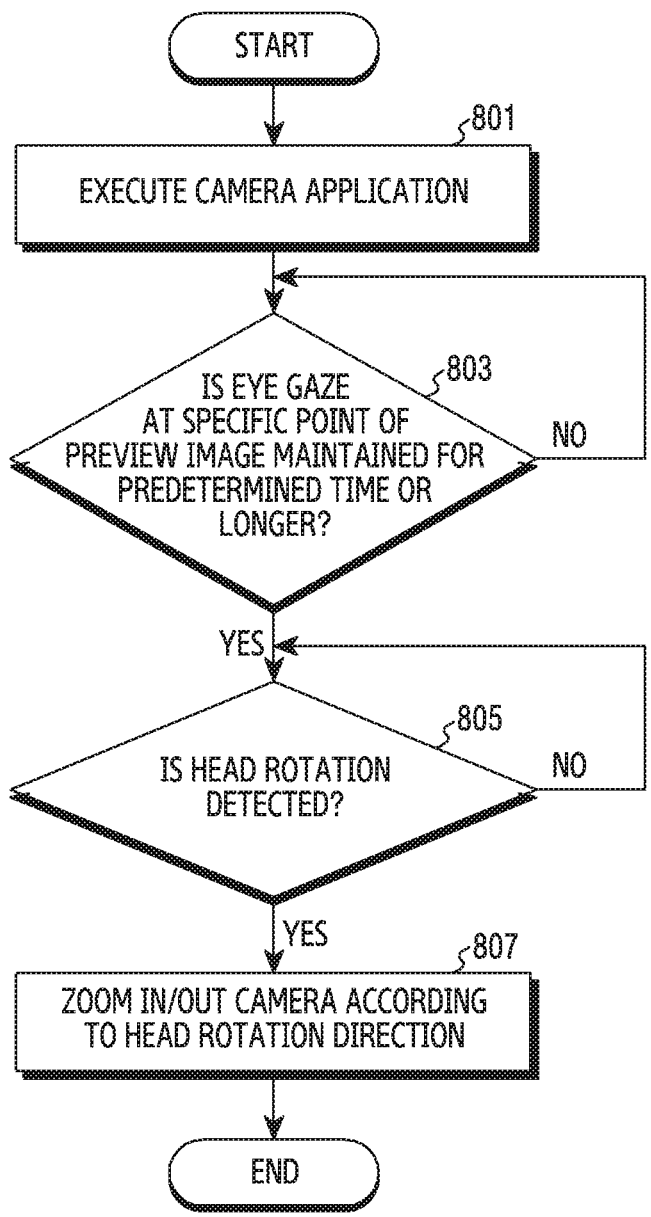
FIG. 8 is a flowchart illustrating a process in which an electronic device controls a zoom level of a camera based on an eye gaze and head rotation according to an embodiment of the disclosure.

FIG. 8 is a flowchart illustrating a process in which an electronic device controls a zoom level of a camera based on an eye gaze and head rotation according to an embodiment of the disclosure. FIG. 8 illustrates a method of operating the electronic device 100.

Referring to FIG. 8, in operation 801, the electronic device executes a camera application. The electronic device activates a camera module according to execution of the camera application and displays a preview image of an input made through the camera module.

In operation 803, the electronic device identifies whether an eye gaze is maintained at a specific point of the preview image for a predetermined time or longer. The electronic device tracks the eye gaze of the user through the camera and identifies whether the eye gaze at a specific point is maintained for a predetermined time or longer, in other words, the time for which the eye gaze at the specific point is larger than a threshold value according to the tracking result. When the eye gaze at the specific point is maintained for a predetermined time or longer, the corresponding point may be determined as an anchor point.

When the eye gaze at the specific point is maintained for a predetermined time or longer, the electronic device identifies whether head rotation is detected in operation 805. The head rotation may be identified by three components, such as yaw, pitch, and roll. The electronic device may detect head rotation through a camera or a sensor.

When head rotation is detected, the electronic device controls the zoom level of the camera, that is, zooms in or zooms out according to a head rotation direction in operation 807. For example, the electronic device analyzes the head rotation as a zoom in/output command. When zoom-in/out is performed by digital-zoom, the electronic device may perform zoom-in/out based on the anchor point.

In the embodiment described referring to FIG. 8, when the eye gaze is maintained for a predetermined time or more, the head rotation is treated as a zoom level control command. According to another embodiment, operations 805 and 807 may be performed only through a voice command without maintenance of the eye gaze. For example, operation 803 may be replaced with an operation for detecting a voice command (for example, "Control zoom!") indicating the control of the zoom level by head rotation.

The embodiment described referring to FIG. 8 is related to zoom-in/out of the camera when the camera application is executed. The embodiment of FIG. 8 may be expanded to an image gallery. For example, in a situation in which a stored image is displayed rather than an image input through the camera, the electronic device may zoom in/out the image through a procedure similar to operations 803, 805, and 807.

Figure 9:
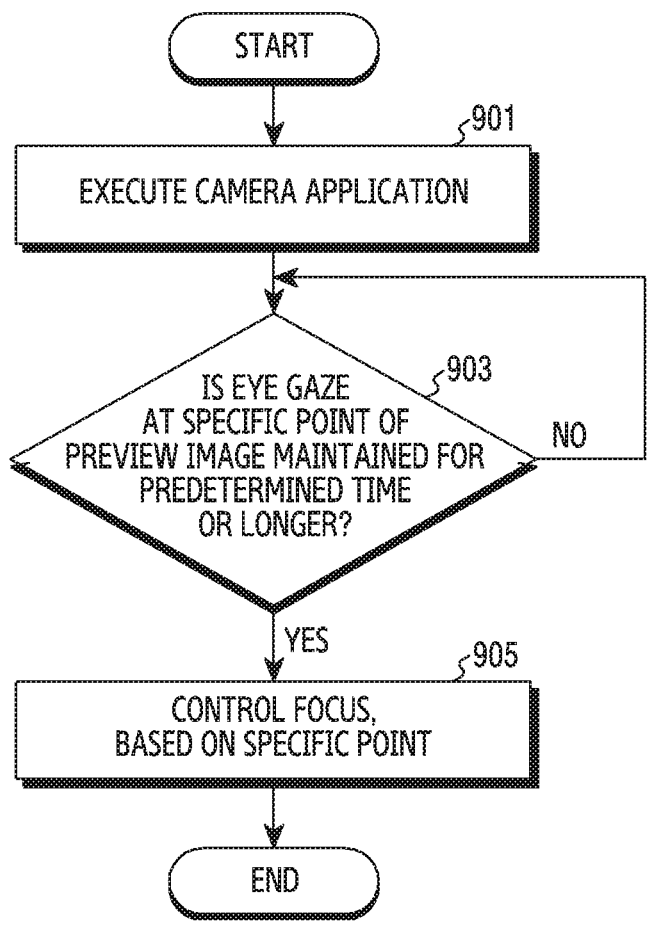
FIG. 9 is a flowchart illustrating a process in which an electronic device controls a focus of a camera based on an eye gaze according to an embodiment of the disclosure.

FIG. 9 is a flowchart illustrating a process in which an electronic device controls a focus of a camera based on an eye gaze according to an embodiment of the disclosure. FIG. 9 illustrates a method of operating the electronic device 100.

Referring to FIG. 9, in operation 901, the electronic device executes a camera application. The electronic device may execute a camera module according to execution of the camera application and displays a preview image of an image input through the camera module.

In operation 903, the electronic device identifies whether an eye gaze is maintained at a specific point of the preview image for a predetermined time or longer. The electronic device tracks the eye gaze of the user through the camera and identifies whether the eye gaze at a specific point is maintained for a predetermined time or longer, in other words, the time for which the eye gaze at the specific point is larger than a threshold value according to the tracking result.

When an eye gaze is maintained at a specific point for a predetermined time or longer, the electronic device controls the focus based on the specific point in operation 905. For example, the electronic device may estimate a distance between the electronic device and an object located at an anchor point and control the focal distance according to the estimated distance. The eye gaze at the specific point may be analyzed as an input for determining the anchor point, and maintenance of the eye gaze at the specific point for a predetermined time or longer may be analyzed as a control command for controlling the focus.

In the embodiment described referring to FIG. 9, the focal distance of the camera may be determined by the eye gaze. According to another embodiment, the focal distance may be controlled by head rotation. When the user rotates the head after the focal distance is controlled based on the distance from the object located at the anchor point determined by the eye gaze, the electronic device may further control the focal distance according to head rotation. Accordingly, the user may more accurately control the focus.

In the above-described various embodiments, the eye gaze is used to determine the anchor point or the object to be controlled. However, according to other embodiments, the electronic device may determine the anchor point or the object without eye gaze tracking. In this case, even though the electronic device does not have an eye gaze tracking function, the proposed various embodiments may be implemented. An embodiment of controlling the object without eye gaze tracking is described with reference to FIG. 10.

Figure 10:
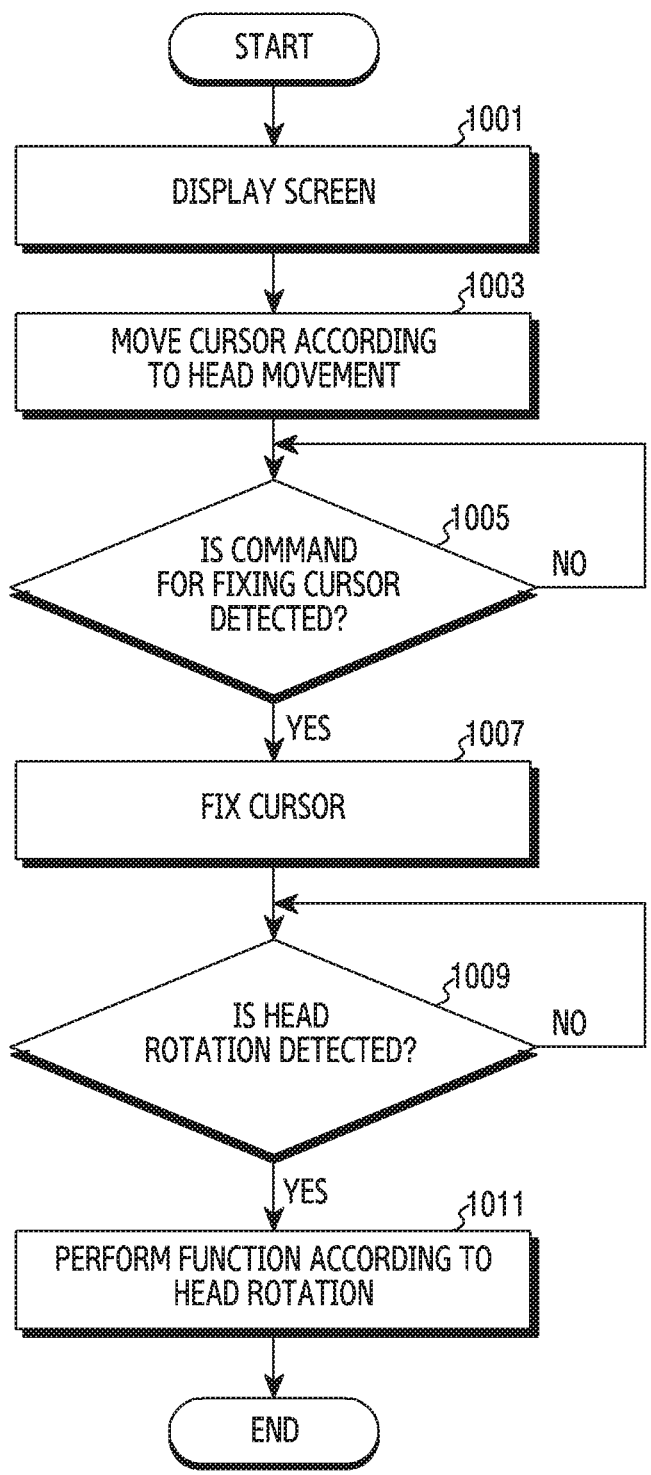
FIG. 10 is a flowchart illustrating a process in which an electronic device controls an object without eye gaze tracking according to an embodiment of the disclosure.

FIG. 10 is a flowchart illustrating a process in which an electronic device controls an object without eye gaze tracking according to an embodiment of the disclosure. FIG. 10 illustrates a method of operating the electronic device 100.

Referring to FIG. 10, in operation 1001, the electronic device displays a screen. The screen may vary depending on an application being executed. For example, the electronic device may display an image, a moving image, and a VR screen. At this time, the electronic device displays a cursor within the screen. According to an embodiment, the cursor may be generated by a start command. In operation 1003, the electronic device moves the cursor according to movement of the head. The electronic device may detect user head rotation and move the cursor according to a direction of the head rotation.

In operation 1005, the electronic device identifies whether a command for fixing the cursor is detected. For example, the command for fixing the cursor may include at least one of a touch, a button press, a gesture, and a voice command. When the command for fixing the cursor is detected, the electronic device fixes the cursor in operation 1007. For example, the electronic device fixes the cursor at a location at which the cursor is displayed at a time point at which the command for fixing the cursor is detected. Thereafter, the location at which the cursor is fixed may be treated as an anchor point.

In operation 1009, the electronic device identifies whether head rotation is detected. When the head rotation is detected, the electronic device performs a function according to the head rotation in operation 1011. The executed function may depend on the executed application or the location of the anchor point. For example, the electronic device may perform a function (for example, object rotation, image modification, image rotation, zoom level control, and focus control) related to one of the above-described various embodiments.

In the above-described various embodiments, the object is controlled after the anchor point is determined. According to other embodiments, there may be no separate operation for determining the anchor point. According to an embodiment, the operation for determining the anchor point may be combined with the operation for controlling the object without separation therefrom. For example, the anchor point may be continuously changed while the object is controlled. For example, the current location of the movable cursor may be treated as the anchor point while the object is controlled. According to another embodiment, the anchor point may be not variable but may be fixed at a predefined location.

Figure 11A:
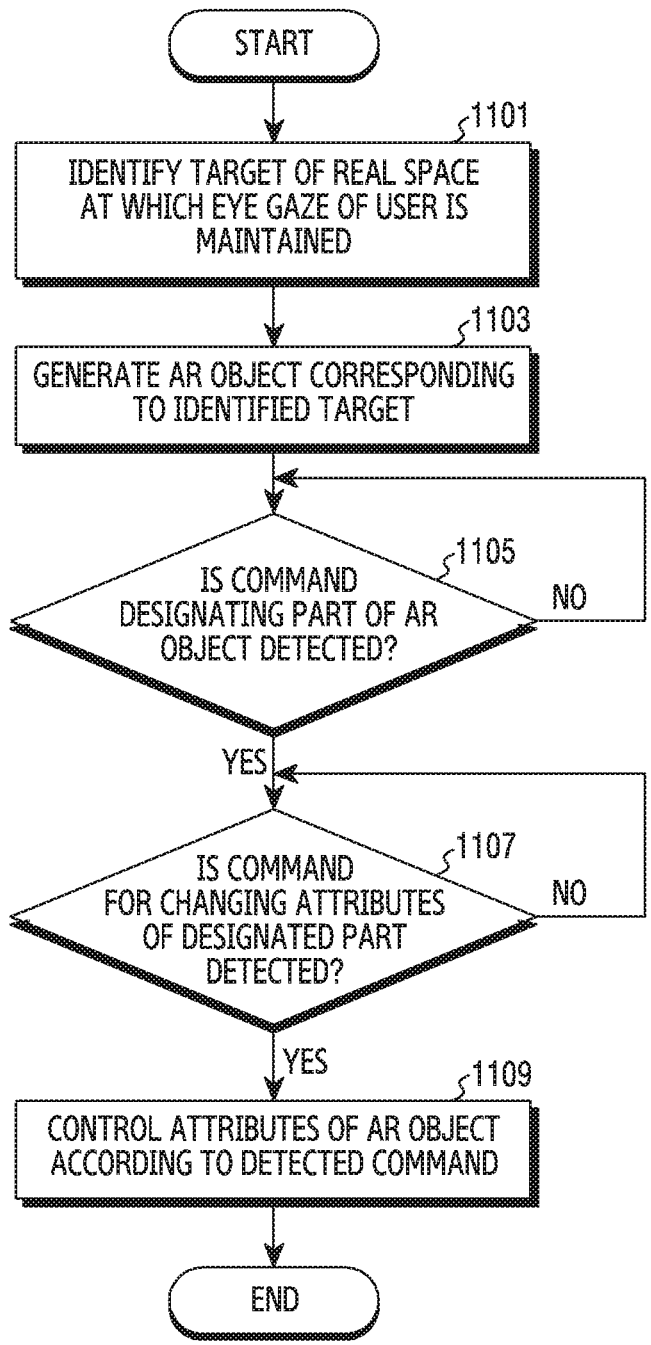
FIG. 11A is a flowchart illustrating a process in which an electronic device controls an Augmented Reality (AR) object using an eye gaze according to an embodiment of the disclosure.

FIG. 11A is a flowchart illustrating a process in which an electronic device controls an AR object based on an eye gaze according to an embodiment of the disclosure. FIG. 11A illustrates a method of operating the electronic device 100.

Figure 11B:
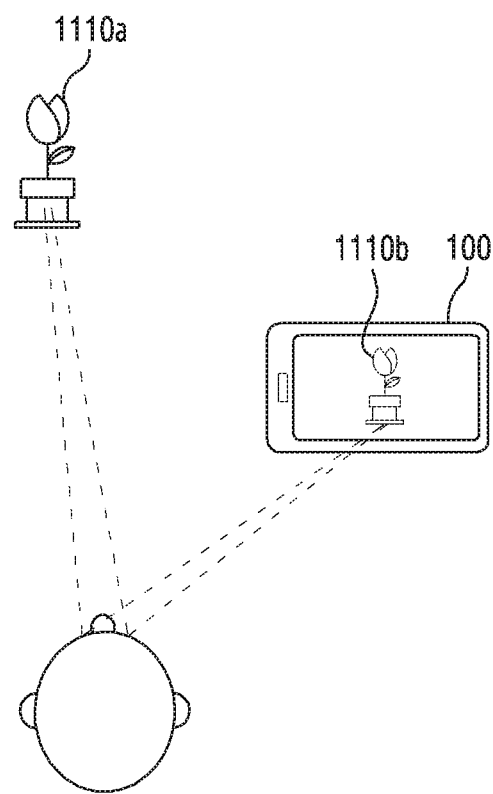
FIG. 11B illustrates an eye gaze for an object in a real space and an AR object in an electronic device according to an embodiment of the disclosure.

FIG. 11B illustrates an eye gaze for an object in a real space and an AR object in an electronic device according to an embodiment of the disclosure.

Referring to FIG. 11A, in operation 1101, the electronic device identifies an object in a real space at which the eye gaze of the user is maintained or an object in a real world. The object in the real space is displayed on the screen of the electronic device. For example, in the state in which an application for generating an AR object (for example, an avatar) is executed and a real space is captured through a camera and displayed, the electronic device may identify an object of the real space at which the user gazes based on eye gaze tracking. For example, referring to FIG. 11B, the eye gaze of the user faces an object 1100a of the real space, and the electronic device 100 may determine that the eye gaze of the user faces the object 1110a in the real space through eye gaze tracking. At this time, the object 1100a in the real space may be captured through the camera, and a captured object 1110b may be displayed on the screen of the electronic device 100.

In operation 1103, the electronic device generates an AR object corresponding to the identified object. Since the identified object is displayed in the electronic device, the electronic device may detect a characteristic of the identified object based on the image. Accordingly, the electronic device may generate an AR object including the detected characteristic. For example, the characteristic may include various attributes, such as an object type (for example, person, dog, cat, and flower) and object appearance (for example, color and size).

In operation 1105, the electronic device identifies whether a command designating a part of the AR object is detected. The command designating the part may be defined in various forms. For example, the command designating the part may be identified based on an eye gaze. According to an embodiment, the electronic device may analyze maintenance of the eye gaze at the specific part of the AR object for a predetermined time or longer as the command designating the part. According to another embodiment, the electronic device may analyze a voice command generated in the state in which the eye gaze is maintained at the specific part of the AR object as the command designating the part. For example, when the AR object is a person-shaped avatar, the part which can be designated may be hair, face, clothes, hand, or leg.

In operation 1107, the electronic device identifies whether a command for changing attributes of the designated part is detected. The command for changing the attributes may be defined in various forms. According to an embodiment, the command for changing the attributes may be defined based on head rotation. According to another embodiment, the command for changing the attributes may be defined based on movement of a slide bar by a touch input.

When the command for changing the attributes is detected, the electronic device controls attributes of the AR object according to the detected command in operation 1109. An attribute value indicated by the command for changing the attributes may be applied to the AR object, and the AR object to which the indicated attribute value is applied may be displayed. According to an embodiment, when the command for changing the attributes is defined based on the head rotation, if the head is rotated in one direction in the state in which the part is designated, the electronic device may apply and display candidate attributes. For example, as an angle of rotation increases, a plurality of candidate attributes may be sequentially displayed. According to another embodiment, when the command for changing the attributes is defined based on movement of the slide bar by the touch input, if the slide bar moves according to the touch input in the state in which the part is designated, the electronic device may apply and display candidate attributes. For example, as a movement distance of the slide bar increases, the plurality of candidate attributes may be sequentially displayed.

The above-described various embodiments may be expanded to control the time point or the object in the VR system. For example, the above-described embodiments may be applied to navigate the user within the virtual space, change a camera view of a camera around the object, or translate or rotate the object within the virtual space.

The VR service may be provided by a Head-Mounted Display (HMD) electronic device or an electronic device installed in a headset. In this case, since a display is close to a user's eyes, it is generally difficult to use a touch input through a touch screen. Examples of inputs which can be recognized through the HMD or the headset are described with reference to FIGS. 12A and 12B.

Figure 12A:
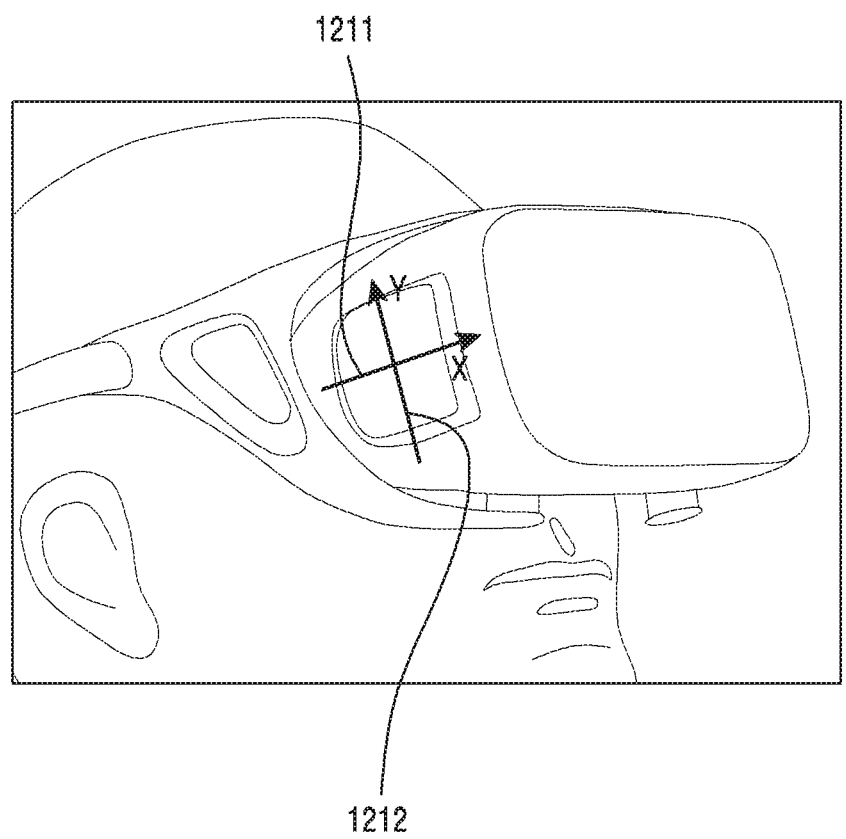
FIG. 12A illustrates an input which can be recognized by a Virtual Reality (VR) headset in an electronic device according to an embodiment of the disclosure.
Figure 12B:
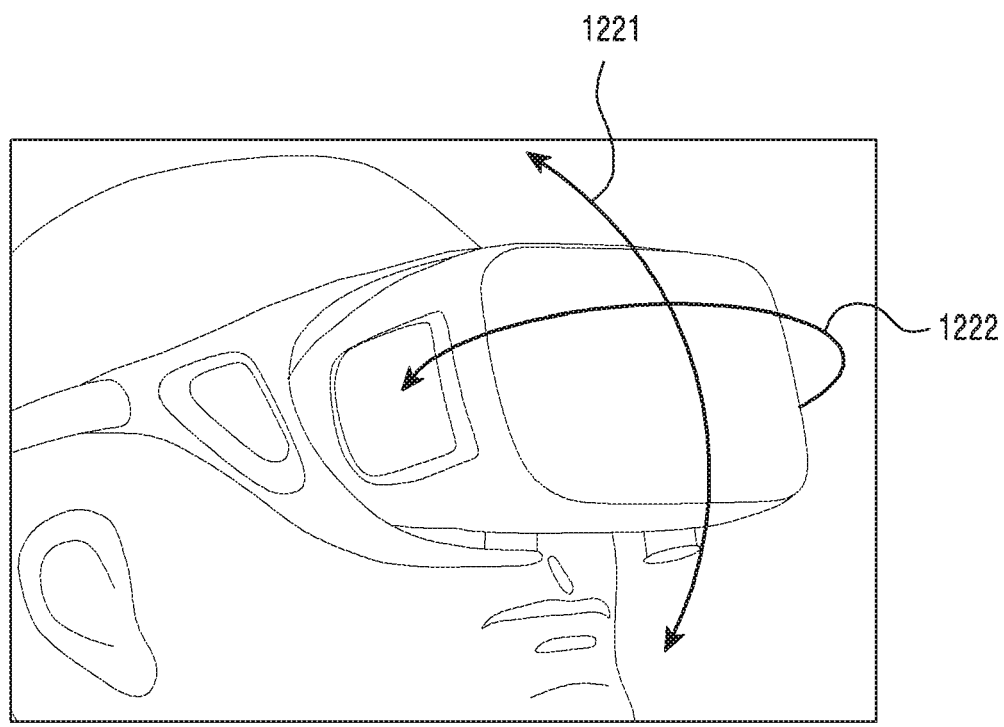
FIG. 12B illustrates an input which can be recognized by a Virtual Reality (VR) headset in an electronic device according to an embodiment of the disclosure.

FIG. 12A illustrates an input which can be recognized by a VR headset of an electronic device according to an embodiment of the disclosure, and FIG. 12B illustrates an input which can be recognized by a VR headset of an electronic device according to an embodiment of the disclosure.

Referring to FIG. 12A, an X axis 1211 and a Y axis 1212 may be defined on a touch pad, and a touch input of which a touch point moves along the X axis 1211 and a touch input of which a touch point moves along the Y axis 1212 may be recognized.

Referring to FIG. 12B, an input 1221 corresponding to up and down rotation of the user's head and an input 1222 corresponding to left and right rotation of the head may be recognized. The control described in the following embodiment may be performed using the inputs illustrated in FIGS. 12A and 12B.

According to various embodiments, the control operation in the VR space may be grouped into lower modes. Each lower mode has a unique purpose. For example, lower modes, such as movement of the user and selection of rotation of the object in the virtual world may be defined. In each mode, head rotation corresponds to rotation of a viewpoint in the VR space As a first lower mode for the control in the VR mode, user movement, that is, viewpoint movement in the VR space may be processed as follows. It is assumed that a direction of the viewpoint movement corresponds to a current line of sight. The line of sight depends on head rotation. According to an embodiment, a speed and a direction of the movement may follow a touch input on the X axis 1211 or the Y axis 1212 of the touch pad. For example, putting a finger on the X axis 1122 may be analyzed as an intention to move the user along an axis which the user faces the object. Moving back means inversely moving the viewpoint. The Y axis 1212 may be used to move the user on an axis perpendicular to the X axis 1211. For example, the X axis 1211 may be used for movement in a forward-backward direction, and the Y axis 1212 may be used of a height change. According to another embodiment, a speed and a direction of the movement may follow the up and down rotation 1221 or the left and right rotation 1222. An embodiment for viewpoint movement within the VR space is described below with reference to FIG. 13A.

Figure 13A:
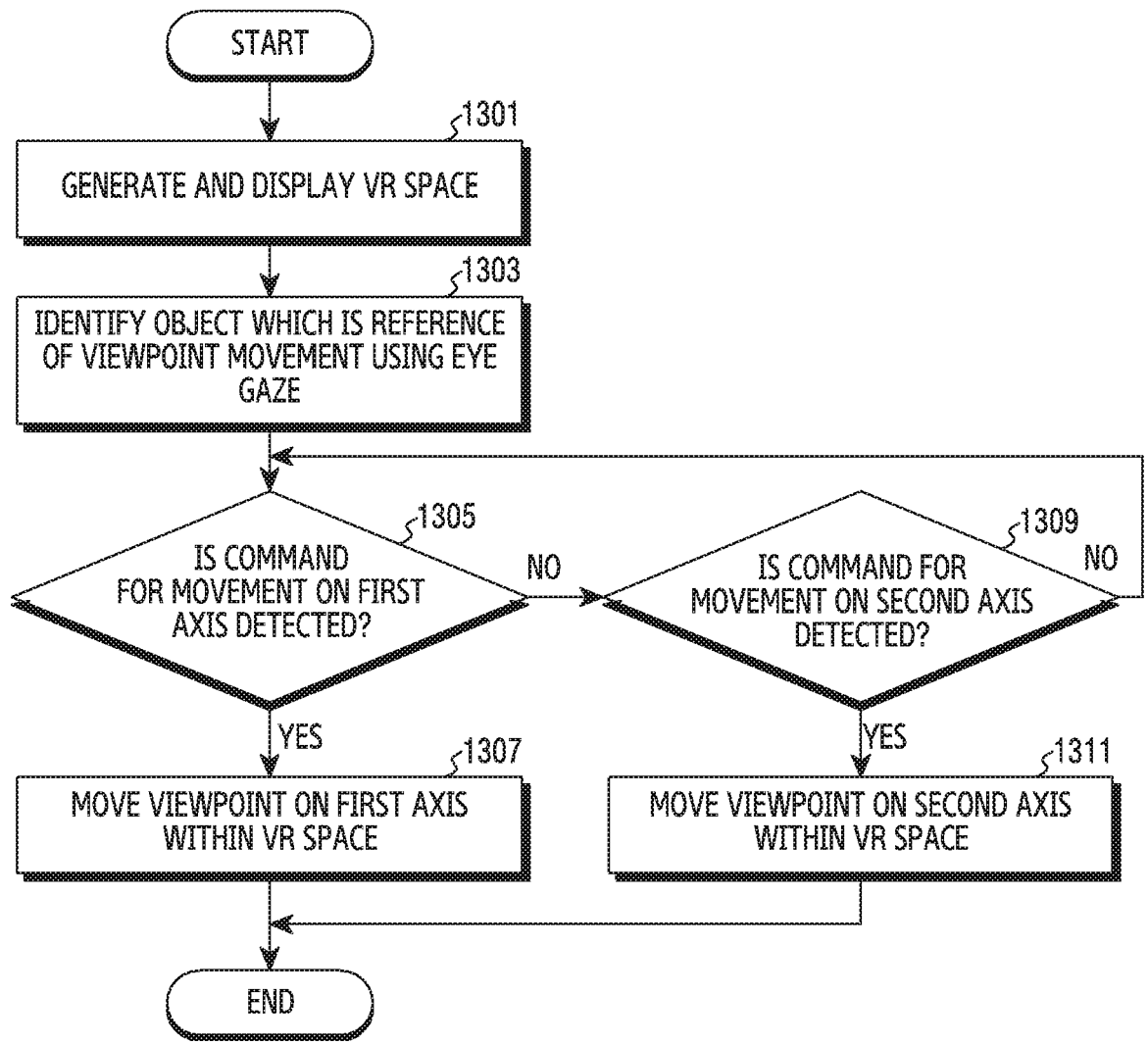
FIG. 13A is a flowchart illustrating a process in which an electronic device moves a viewpoint within a VR space according to an embodiment of the disclosure.

FIG. 13A is a flowchart illustrating a process in which an electronic device moves a viewpoint within a VR space according to an embodiment of the disclosure. FIG. 13A illustrates a method of operating the electronic device 100.

Figure 13B:
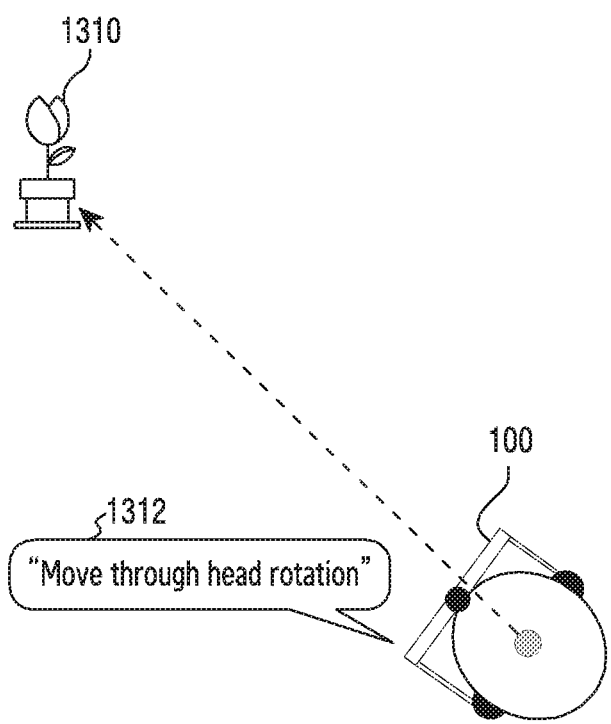
FIG. 13B illustrates a viewpoint movement within a VR space in an electronic device according to an embodiment of the disclosure.
Figure 13C:
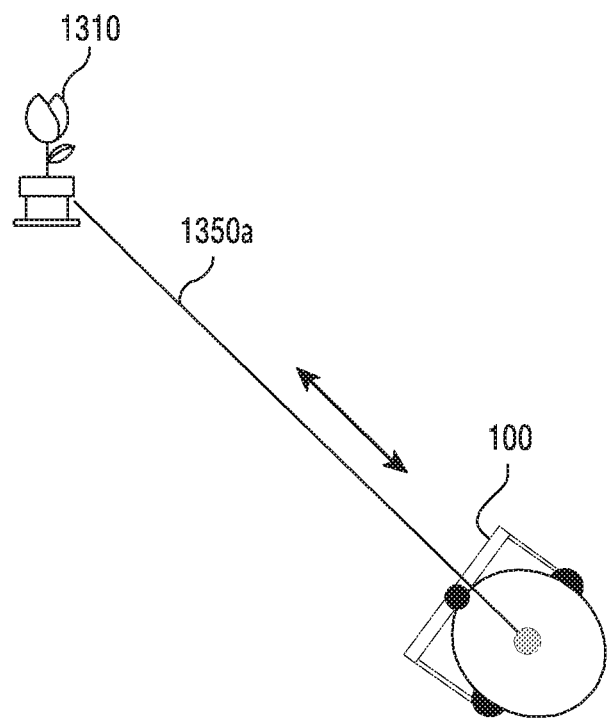
FIG. 13C illustrates a viewpoint movement within a VR space in an electronic device according to an embodiment of the disclosure
Figure 13D:
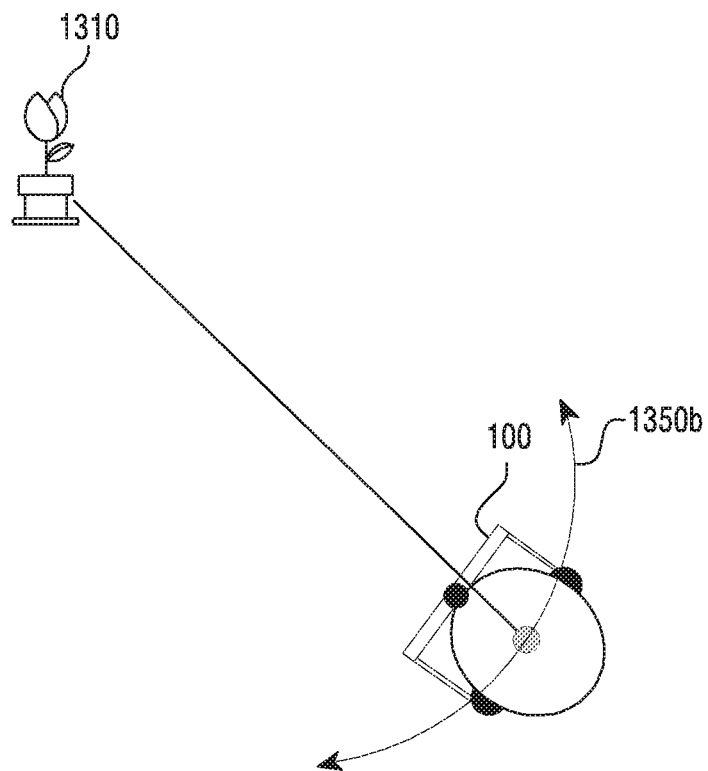
FIG. 13D illustrates a viewpoint movement within a VR space in an electronic device according to an embodiment of the disclosure.

FIG. 13B illustrates a viewpoint movement within a VR space in an electronic device according to an embodiment of the disclosure, FIG. 13C illustrates a viewpoint movement within a VR space in an electronic device according to an embodiment of the disclosure, and FIG. 13D illustrates a viewpoint movement within a VR space in an electronic device according to an embodiment of the disclosure.

Referring to FIG. 13A, in operation 1301, the electronic device generates and displays a VR space. The electronic device may generate a VR space including at least one object, determine a viewpoint within the space, and then display a screen based on the determined viewpoint.

In operation 1303, the electronic device identifies an object (hereinafter, referred to as a "reference object") which is a reference of viewpoint movement using an eye gaze. The electronic device may track an eye gaze of the user and identify an object within a VR space which the eye gaze faces. According to an embodiment, when the eye gaze of the user is maintained at a specific object for a predetermined time or longer, the electronic device may determine the specific object as the reference object. According to another embodiment, when an additional command for designating the reference object is generated while the eye gaze of the user is maintained at the specific object, the electronic device may determine the specific object as the reference object. For example, the additional command may include at least one of a touch input (for example, touch input of two points) in a predefined pattern, head rotation (for example, nodding) in a predefined pattern, and a voice command (for example, "Move the viewpoint!") having the predefined content. A first axis connecting the user and the reference object may be configured according to designation of the reference object. The first axis is configured as a straight line connecting the user and the reference object and is used as a path along which the viewpoint is moved by the following input.

In operation 1305, the electronic device identifies whether a command for movement on the first axis is detected. According to various embodiments, the command for movement on the first axis may include at least one of a first command designating a means indicating a movement direction and a second command indicating a direction. For example, a voice command 1312 (for example, "Move through head rotation!") of the user as illustrated in FIG. 13B may be treated as the first command designating head rotation as the means for inputting the movement direction. Alternatively, another voice command (for example, "Move through the touch!") of the user may be treated as the first command designating a touch input using a touch panel as the means for inputting the movement direction. The movement of the touch point on the X axis 1211 of FIG. 12A or the up and down rotation 1221 of FIG. 12B may be treated as the second command indicating the movement direction according to the designated means. According to an embodiment, when the means indicating the direction is predefined, the first command may be omitted.

When the command for movement on the first axis is detected, the electronic device moves the viewpoint on the first axis within the VR space in operation 1307. For example, referring to FIG. 13C, the electronic device may move the viewpoint on a first axis 1350a. At this time, the electronic device may move the viewpoint in a direction closer to the object 1310 or farther from the object 1310 according to the direction indicated by the command. A speed of the movement may depend on a speed of the rotation or a speed of the movement of the touch point.

In operation 1309, the electronic device identifies whether a command for movement on the second axis is detected. The second axis is a circular axis based on the reference object and contacts the location of the user. According to various embodiments, the command for movement on the second axis may include at least one of a first command designating a means indicating a movement direction and a second command indicating a direction. For example, the means for inputting the movement direction may be designated as head rotation by the voice command 1312 (for example, "Move through head rotation!") of the user as illustrated in FIG. 13B. In another example, the means for inputting the movement direction may be designated as a touch input using a touch panel by another voice command (for example, "Move through the touch!") of the user. Further, the second command indicating the movement direction may be detected by the movement of the touch point on the Y axis 1212 of FIG. 12A or the left and right rotation 1222 of FIG. 12B according to the designated means. According to an embodiment, when the means indicating the direction is predefined, the first command may be omitted.

When the command for movement on the second axis is detected, the electronic device moves the viewpoint on the second axis within the VR space in operation 1311. For example, referring to FIG. 13C, the electronic device may move the viewpoint on a second axis 1350b. At this time, the electronic device may move the viewpoint in a clockwise direction or a counterclockwise direction according to the direction indicated by the command. A speed of the movement may depend on a speed of the rotation or a speed of the movement of the touch point.

In the embodiment described referring to FIG. 13A, the movement of the viewpoint is performed by the touch input on the touch panel or the head rotation. According to another embodiment, the touch input on the touch panel and the head rotation may be combined and used. For example, the movement direction may be determined by one of the touch input and the head rotation, and the movement speed may be determined by the remaining one. Specifically, the movement direction may be selected by the touch input (for example, movement of the touch point on the X axis or the Y axis) on the touch panel, and the movement speed may be selected by the head rotation (for example, up and down rotation).

In the embodiment described referring to FIG. 13A, each of the command for movement on the first axis and the command for movement on the second axis may include the first command designating the means indicating the movement direction. However, when the user inputs a plurality of commands for movement on the first axis or the second axis, only a minimum of the command may include the first command. In this case, in at least one following command, the second command indicating the direction may follow the means designated by the first command included in an initial command.

In the embodiment described referring to FIG. 13A, the first command designating the means indicating the movement direction has been described as a part of the command for moving the viewpoint. According to another embodiment, the first command may be used as a command designating the reference object. For example, when the first command (for example, the voice command 1312 of FIG. 13B) is generated while the eye gaze of the user is maintained at the specific object, the electronic device may determine the specific object as the reference object and simultaneously determine the means indicating the movement direction.

As a second lower mode for the control in the VR space, the object edit in the VR space may be processed as follows. The object edit may be one of object addition, object rotation, and object movement. The location to which the object is added and the object to be rotated/moved may be identified using the eye gaze, and the object to be added may be selected or the object may be rotated or moved using the following touch input or head rotation. An embodiment for the object edit within the VR space is described below referring to FIG. 14A.

Figure 14A:
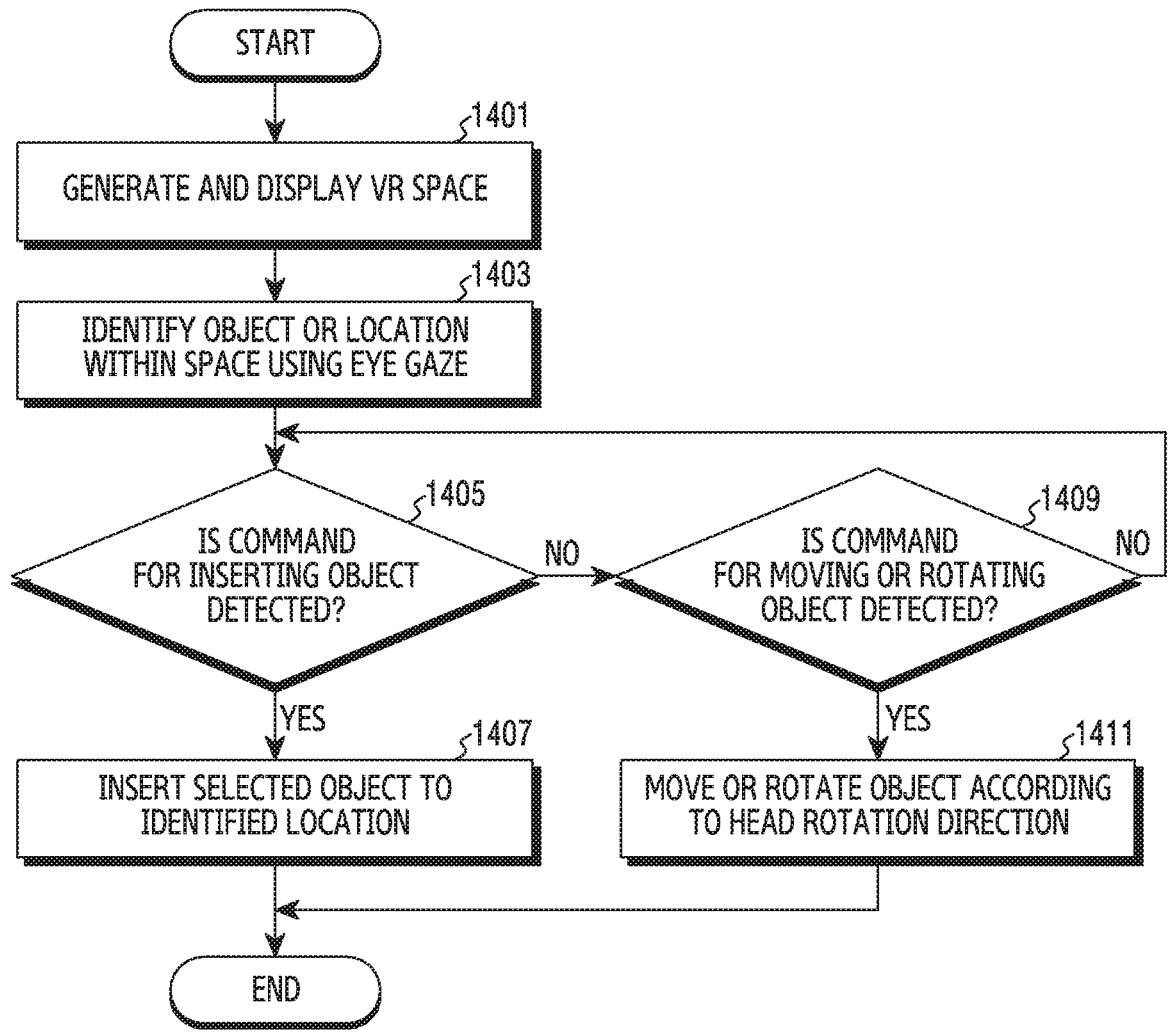
FIG. 14A is a flowchart illustrating a process in which an electronic device controls an object within a VR space according to an embodiment of the disclosure.

FIG. 14A is a flowchart illustrating a process in which an electronic device controls an object within a VR space according to an embodiment of the disclosure. FIG. 14A illustrates a method of operating the electronic device 100.

Figure 14B:
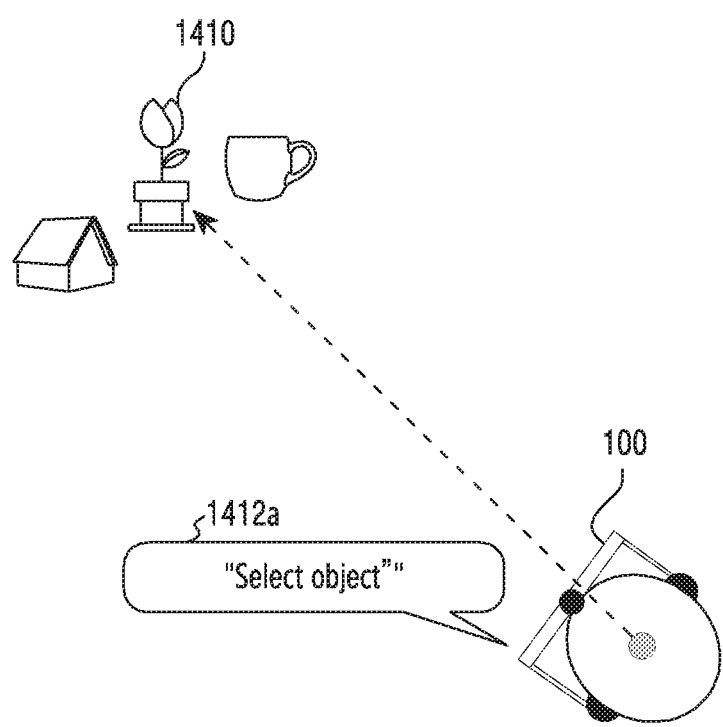
FIG. 14B illustrates an object control within a VR space in an electronic device according to an embodiment of the disclosure.
Figure 14C:
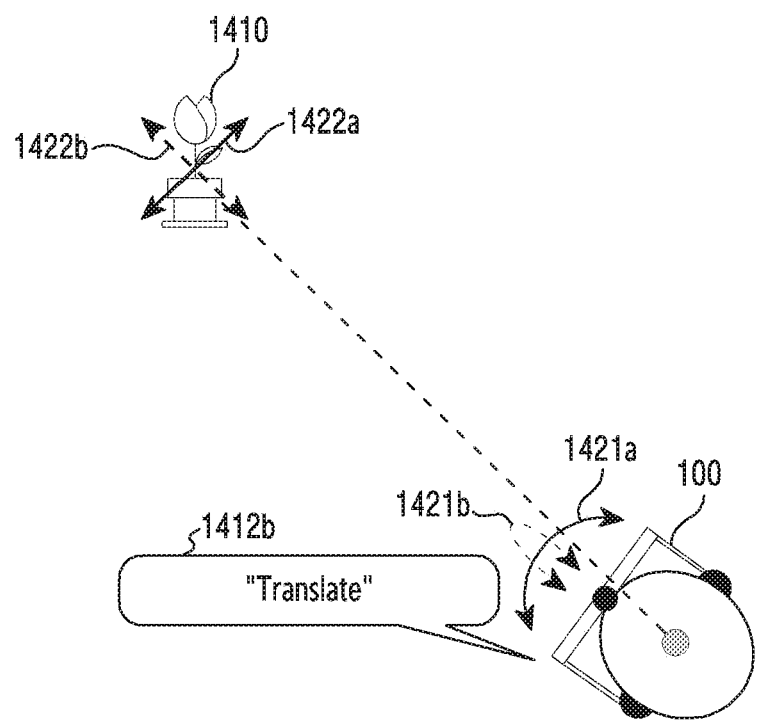
FIG. 14C illustrates an object control within a VR space in an electronic device according to an embodiment of the disclosure.
Figure 14D:
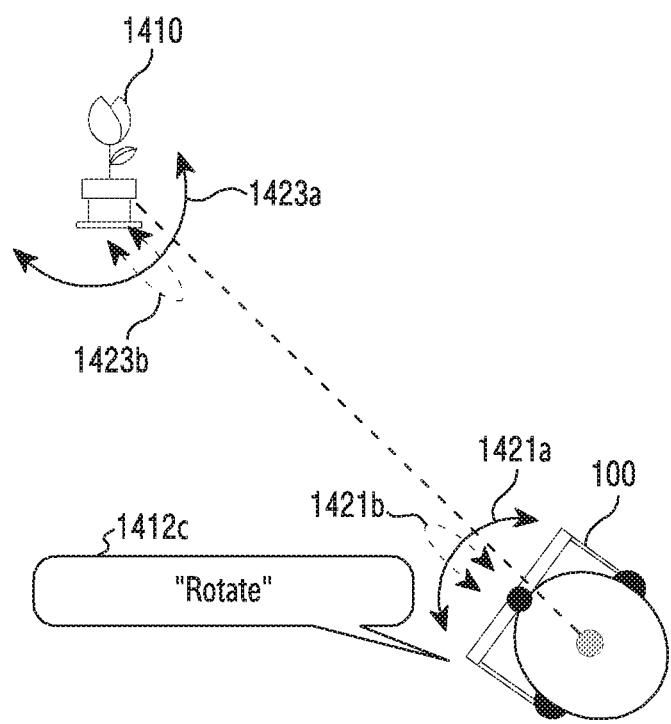
FIG. 14D illustrates an object control within a VR space in an electronic device according to an embodiment of the disclosure.

FIG. 14B illustrates an object control within a VR space in an electronic device according to an embodiment of the disclosure, FIG. 14C illustrates an object control within a VR space in an electronic device according to an embodiment of the disclosure, and FIG. 14D illustrates an object control within a VR space in an electronic device according to an embodiment of the disclosure.

Referring to FIG. 14A, in operation 1401, the electronic device generates and displays a VR space. The electronic device may generate a VR space including at least one object, determine a viewpoint within the space, and then display a screen based on the determined viewpoint.

In operation 1403, the electronic device identifies an object or a location within the space based on an eye gaze. According to an embodiment, when an eye gaze of the user is maintained at a specific location or a specific object for a predetermined time or longer, the electronic device may determine the specific location or the specific object as a location (hereinafter, referred to as a "target location) to which the specific object is added or an object (hereinafter, referred to as a "target object") to be moved/rotated. According to another embodiment, when an additional command for designating the target location or the target object is generated while the eye gaze of the user is maintained at the specific location or the specific object, the electronic device may determine the specific location or the specific object as the target location or the target object. For example, the additional command may include at least one of a touch input (for example, a touch input of two points) in a predefined pattern, head rotation (for example, nodding) in a predefined pattern, and a voice command (for example, "Edit the object!") having the predefined content.

In operation 1405, the electronic device identifies whether a command for inserting the object is detected. According to an embodiment, the command for inserting the object may include selection of an object to be inserted. For example, in response to a voice command "Select the object!" 1412a as illustrated in FIG. 14B, the electronic device may display a list indicating at least one object which can be added and identify user's selection for one object included in the list (for example, using at least one of an eye gaze, a voice command, a touch input, and head rotation). According to another embodiment, when an object to be added is predefined or pre-selected, the voice command "Select the object!" 1412a may be treated as the command for inserting the object.

When the command for inserting the object is detected, the electronic device inserts the selected object to the identified location in operation 1407. In other words, the electronic device may insert the object indicated by the user's selection detected in operation 1405 to the target location identified in operation 1403.

In operation 1409, the electronic device identifies whether a command for moving or rotating the object is detected. The command for movement or rotation includes at least one of a first command indicating movement or rotation and a second command indicating a direction of the movement or rotation. The first command may include a voice command. For example, a voice command 1412b (for example, "Translate!") of the user for moving the object as illustrated in FIG. 14C may be treated as the first command. In another example, a voice command 1412c (for example, "Rotate!") of the user for rotating the object as illustrated in FIG. 14D may be treated as the first command indicating rotation. Head rotation followed by the first command may be treated as the second command. According to another embodiment, instead of or in parallel with the head rotation, a touch input using a touch pad may be treated as the second command.

In operation 1411, the electronic device moves or rotates the object in a head rotation direction. For example, when movement is designated as illustrated in FIG. 14C, the electronic device may move an object 1410 on a basis of left and right rotation 1421a along a left and right axis 1422a and move the object 1410 based on an up and down rotation 1421b along an up and down axis 1422b. In another example, when rotation is designated as illustrated in FIG. 14D, the electronic device may move the object based on the left and right rotation 1421a along a horizontal axis 1423a and move the object 1410 based on the up and down rotation 1421b along a vertical axis 1423b. According to another embodiment, the electronic device may move or rotate the object according to a touch input of which a touch point moves along the X axis 1211 of FIG. 12A or the Y axis 1212 of FIG. 12A. At this time, a movement speed of the object 1410 may depend on a speed of head rotation or a speed of movement of the touch point.

The above-described various embodiments may be expanded to control the AR object in the AR system. For example, the user may rotate or move the AR object according to the following various embodiments. Embodiments for rotating the AR object are described below.

Figure 15A:
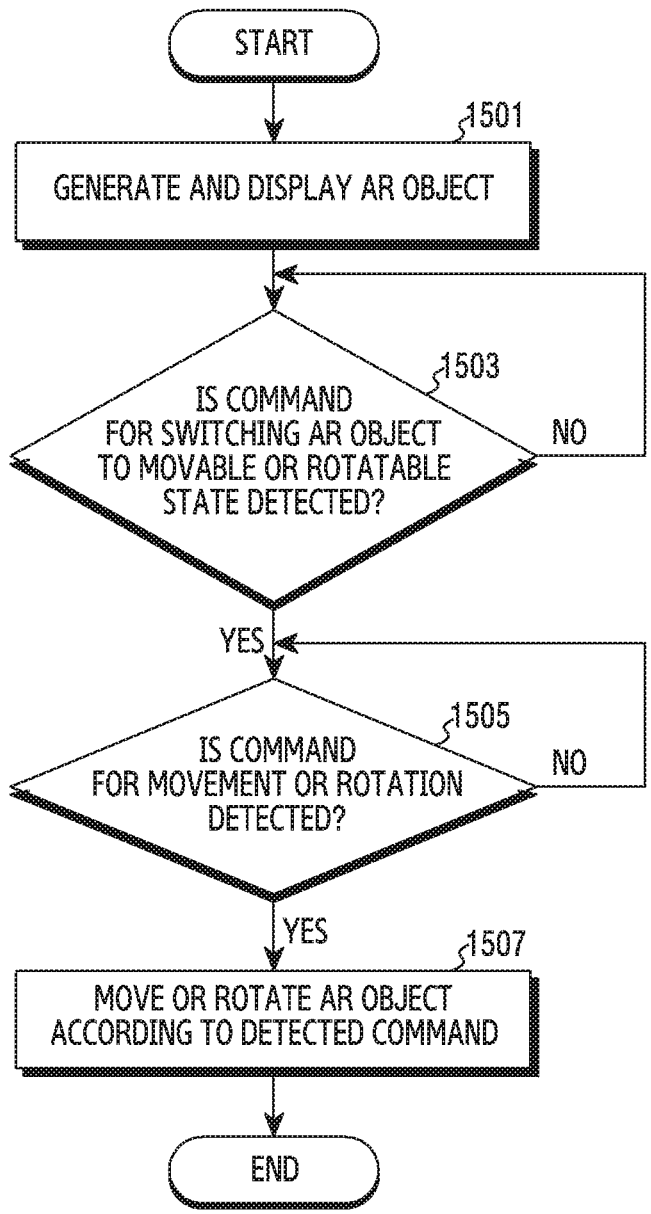
FIG. 15A is flowchart illustrating a process in which an electronic device rotates an AR object according to an embodiment of the disclosure.

FIG. 15A is flowchart illustrating a process in which an electronic device rotates an AR object according to an embodiment of the disclosure. FIG. 15A illustrates a method of operating the electronic device 100.

Figure 15B:
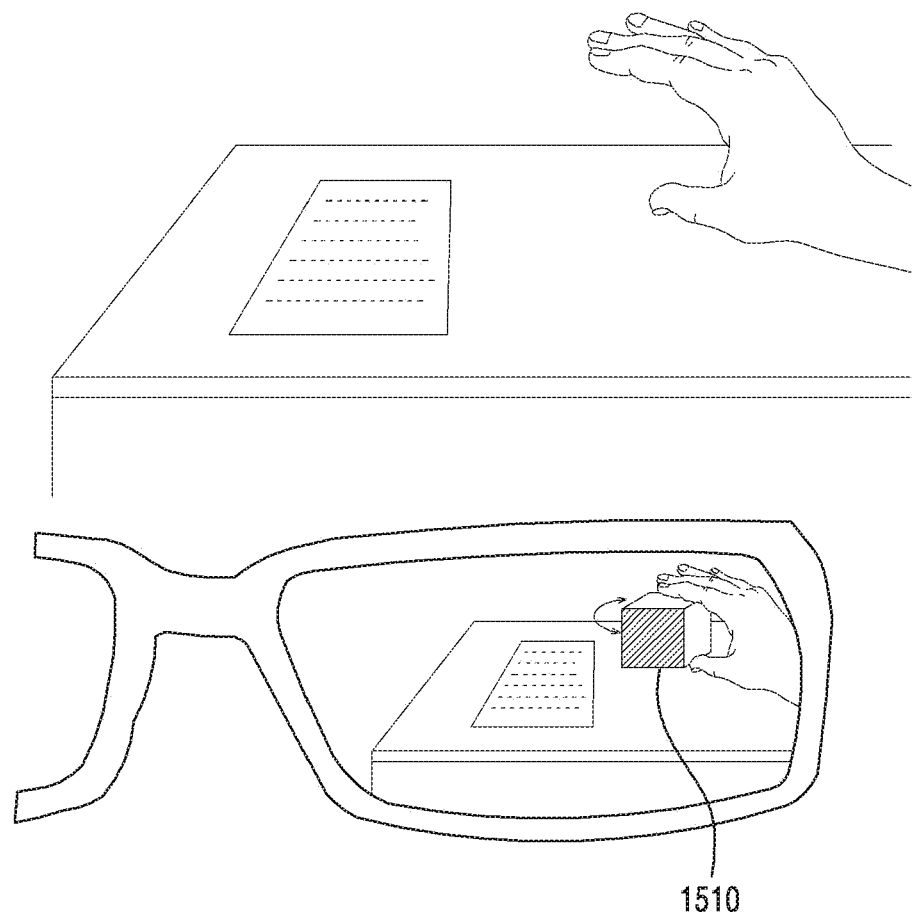
FIG. 15B illustrates a rotation of an AR object in an electronic device according to an embodiment of the disclosure.

FIG. 15B illustrates a rotation of an AR object in an electronic device according to an embodiment of the disclosure.

Referring to FIG. 15A, in operation 1501, the electronic device generates and displays an AR object. In other words, the electronic device may generate a virtual AR object and display the generated AR object on a display unit. For example, the electronic device may detect a real space or a real world through a vision sensor, such as a camera, an Infrared (IR) sensor, a depth sensor, or a depth camera and add a virtual AR object to the detected real space.

In operation 1503, the electronic device identifies whether a command for switching the AR object to a movable and rotatable state (hereinafter, a "state switching command") is detected. The state switching command may be variously defined. According to various embodiments, the state switching command may be defined based on at least one of an eye gaze, a touch input, a voice command, and a gesture. For example, referring to FIG. 15B, a gesture of making a user's body part (for example, hand) approach an AR object 1510 may be treated as a state switching command for the AR object 1510. Specifically, a space occupied by the shape of the AR object 1510 and a point which the body part contacts may be understood as at least one anchor point, and the generation of at least one anchor point on the surface of or inside the AR object 1510 may be treated as the generation of the state switching command for the AR object 1510. In other words, the electronic device may determine at least one anchor point based on a gesture of bring the user's body part into contact with the space occupied by the AR object.

When the command for switching the AR object to the movable and rotatable state is detected, the electronic device identifies whether a command for moving and rotating the AR object is detected in operation 1505. For example, the command for movement and rotation may be defined based on at least one of an eye gaze, a touch input, a voice command, and a gesture. For example, when the AR object is switched to the movable and rotatable state based on at least one anchor point generated by the gesture as illustrated in FIG. 15B, movement of at least one anchor point may be treated as the command for moving and rotating the AR object.

In operation 1507, the electronic device moves or rotates the AR object according to the detected command. The electronic device moves or rotates the AR object according to the detected command for movement and rotation in operation 1503. For example, as at least one anchor point moves or rotates, the electronic device may move or rotates the AR object. At this time, the location of the AR object on the screen of the electronic device may depend on not only the command for movement and rotation but also a range of the real space detected by the vision sensor, for example, an angle of a camera. For example, when the angle of the camera moves from left to right even though a command only for rotation is generated, the location of the AR object on the screen may move from left to right.

The AR object is displayed on a given coordinate of the real space to make the user experience like being in the real space. For example, when the AR object is composed within an image detected by the vision sensor or a space projected and shown on a display unit (for example, lens) of the electronic device, the location of the AR object depends on the coordinate of the real space. For example, when the range of the real space detected by the vision sensor or captured by the camera is changed, in other words, when the angle of the camera is changed, the location of the AR object on the screen is also changed. If the camera angle is significantly changed, the AR object may disappear out of the screen. However, the user may hope to continuously see the corresponding AR object within the screen. Accordingly, the disclosure presents an embodiment of fixing the AR object to a specific location on the screen.

Figure 16A:
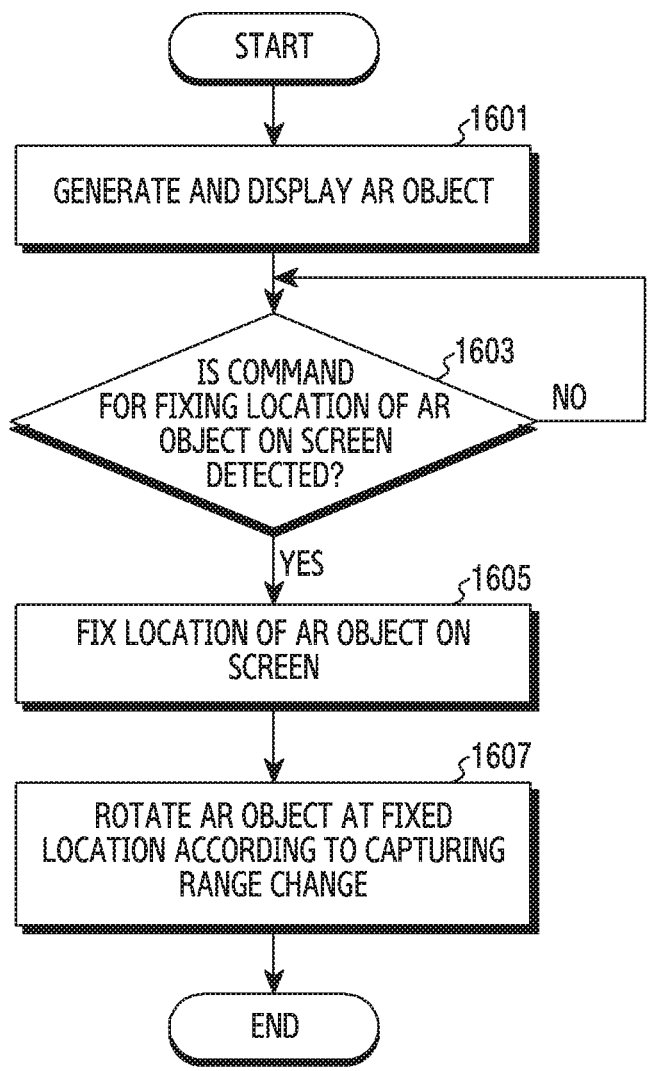
FIG. 16A is a flowchart illustrating a process in which an electronic device rotates an AR object according to an embodiment of the disclosure.

FIG. 16A is a flowchart illustrating a process in which an electronic device rotates an AR object according to an embodiment of the disclosure. FIG. 16A illustrates a method of operating the electronic device 100.

Figure 16B:
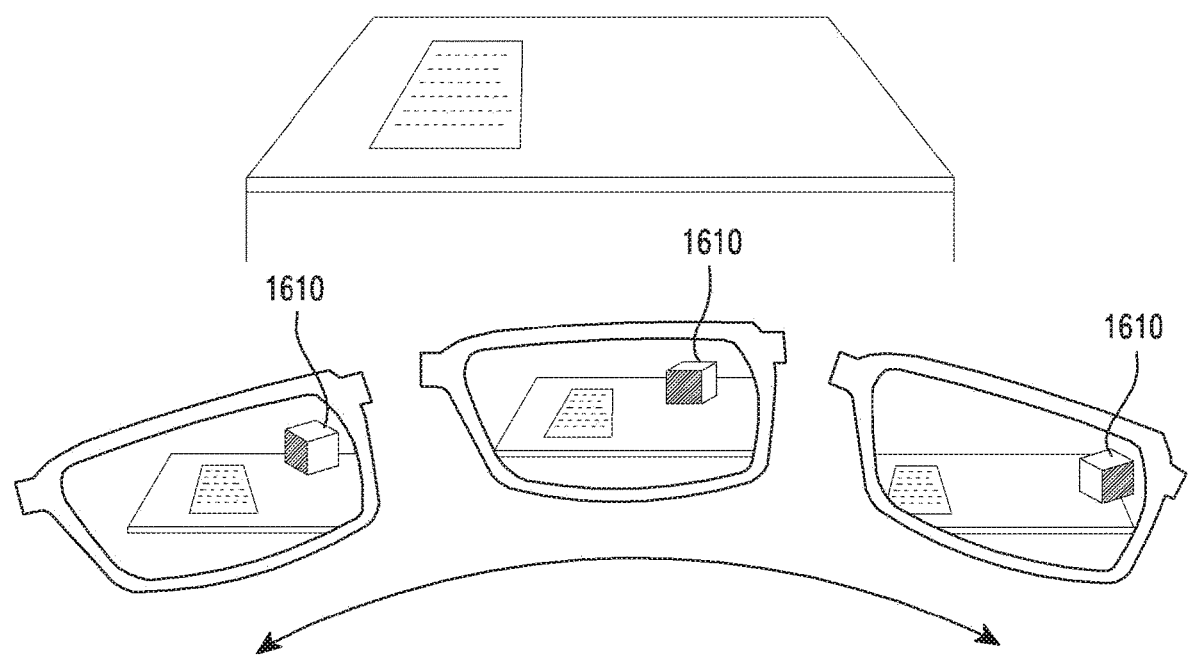
FIG. 16B illustrates a rotation of an AR object in an electronic device according to an embodiment of the disclosure.

FIG. 16B illustrates a rotation of an AR object in an electronic device according to an embodiment of the disclosure.

Referring to FIG. 16A, in operation 1601, the electronic device generates and displays an AR object. In other words, the electronic device may generate and display a virtual AR object. For example, the electronic device may detect a real space through the vision sensor and add the virtual AR object to the detected real space.

In operation 1603, the electronic device identifies whether a command for fixing the location of the AR object on the screen (hereinafter, referred to as a "fixing command") is detected. The fixing command may be variously defined. According to various embodiments, the fixing command may be defined based on at least one of an eye gaze, a touch input, a voice command, and a gesture. For example, a gesture of making a user's body part (for example, hand) approach the AR object for a predetermined time or longer may be treated as the fixing command. Specifically, a space occupied by the shape of the AR object and a point which the body part contacts for the predetermined time or longer may be understood as an anchor point, and the generation of the anchor point on the surface of or inside the AR object may be treated as the generation of the fixing command for the corresponding AR object.

When the fixing command for the AR object is detected, the electronic device fixes the location of the AR object on the screen in operation 1605. The fixed location may be a predefined location or a location of the AR object displayed on the real space detected when the fixing command is generated. At this time, the electronic device may detect a depth of the AR object in the real space, a distance from the electronic device, and a distance or direction relative to the object in the real world. When the eye gaze of the user or the electronic device moves after the AR object is fixed in the real space according to the fixing command, the electronic device may process as if the AR object is fixed in the real space based on the eye gaze or the size, direction, and angle change of the movement of the electronic device. For example, when the AR object has a three-dimensional form and is fixed to the real space, another side of the three-dimensional AR object may be displayed according to movement of the user or the electronic device. Accordingly, even though the camera angle is changed, the AR object is displayed at the fixed location in the real space projected on or by the display unit of the electronic device before the fixing command is released. For example, referring to FIG. 16B, an AR object 1610 may be displayed on the upper right part of the screen.

In operation 1607, the electronic device rotates the AR object at the fixed location according to a change in a capturing range. The location of the AR object on the screen may be fixed by the fixing command, or rotation of the AR object is allowed. Accordingly, in response to the change in the camera angle, the AR object may be rotated. For example, referring to FIG. 16B, when the camera angle is rotated to the left from the front, the AR object 1610 is still displayed on the upper right part of the screen but the AR object 1610 is rotated to the left. Similarly, referring to FIG. 16B, when the camera angle is rotated to the right from the front, the AR object 1610 is still displayed on the upper right part of the screen but the AR object 1610 is rotated to the right.

Various embodiments for controlling the AR object described with reference to FIGS. 15A to 16B may be applied to various applications. For example, various embodiments for controlling the AR object may be applied to an application for displaying the virtual AR object indicating a finished product or an assembly manual while prefabricated models are assembled. In this case, the user may also see the shape of the finished product while assembling the prefabricated models, and may see the finished product in various angles by moving, fixing, or rotating the AR object (for example, using the state switching command or the fixing command) according to various embodiments as necessary.

The above-described various embodiments may be implemented based on various types of inputs. In order to process various types of inputs, the electronic device is required to have a corresponding capability.

For example, an eye gaze tracking function may be needed. The eye gaze tracking technology may be performed by various devices. The eye gaze technology may be implemented using an infrared (IR) signal and a pattern or based on image analysis. The electronic device may perform eye gaze tracking by analyzing movement of a user's eyes.

In another example, a technology for estimating a distance between an object existing in a real space or a virtual space and the electronic device may be required. For example, the distance may be estimated using images captured through two cameras. The electronic device may obtain disparity for the object and estimate the distance based on the disparity. Alternatively, a depth camera technology may be used to estimate the same.

In another example, a technology for detecting a gesture or head rotation may be required. Physical movement of the gesture and the head rotation may be detected through a sensor. The electronic device may detect the existence and size of physical movement of the gesture and the head rotation by analyzing measurement values provided from sensors (for example, an acceleration sensor, a gyro sensor, and a gravity sensor).

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette.

Alternatively, any combination of some or all of the memory described above may form a memory in which the program is stored. Further, a plurality of such memories may be included in the electronic device.

In addition, the programs may be stored in an attachable storage device which is accessible through communication networks, such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device, the method comprising:
   detecting maintenance of an eye gaze of a user corresponding to an object in a real space;
   generate a virtual Augmented Reality (AR) object corresponding to the object in the real space in response to the eye gaze being maintained for a predetermined time or longer;
   displaying the AR object corresponding to a first angle;
   determining at least one anchor point by designating a target to be controlled, based on a first input including at least one of a first gesture, a voice input, or an eye gaze, wherein the at least one anchor point designates the AR object;
   identifying an operation to be performed for the target designated by the at least one anchor point, based on a second input including a head rotation, wherein the second input includes a second gesture of changing an angle of a vision sensor included in the electronic device;
   performing the operation which rotates the AR object in a direction corresponding to the head rotation at a fixed location while fixing a location of the AR object in the real space regardless of the change in the angle of the vision sensor, wherein the AR object is rotated based on the at least one anchor point; and
   displaying the AR object corresponding to a second angle different from the first angle, in response to the rotation of the AR object.

2. The method of claim 1,
   wherein each of the first input and the second input further includes at least one of an eye gaze tracking result, a gesture, a voice, or a touch input, and
   wherein the first input and the second input include different types of inputs from each other.

3. The method of claim 1,
   wherein the at least one anchor point is determined by the first gesture of bringing a user's body part into contact with a space occupied by a virtual Augmented Reality object, and
   wherein the operation moves or rotates the AR object as the at least one anchor point is moved or rotated by the second gesture.

4. The method of claim 1,
   wherein the first input includes maintenance of an eye gaze at a specific point of an image for a predetermined time or longer,
   wherein the second input includes a touch input,
   wherein the at least one anchor point designates the specific point, and
   wherein the operation modifies the image, based on the specific point.

5. An electronic device comprising:
   a detector configured to detect a state inside or outside the electronic device; and
   at least one processor connected to the detector,
   wherein the at least one processor is configured to:
     detect maintenance of an eye gaze of a user corresponding to an object in a real space,
     generate a virtual Augmented Reality (AR) object corresponding to the object in the real space in response to the eye gaze being maintained for a predetermined time or longer,
     display the AR object corresponding to a first angle,
     determine at least one anchor point by designating a target to be controlled, based on a first input identified by the detector, wherein the first input includes at least one of a first gesture, a voice input, or an eye gaze and the at least one anchor point designates the AR object,
     identify an operation to be performed for the target designated by the at least one anchor point, based on a second input identified by the detector, wherein the second input includes a head rotation and a second gesture of changing an angle of a vision sensor included in the electronic device,
     perform the operation which rotates the AR object in a direction corresponding to the head rotation at a fixed location while fixing a location of the AR object in the real space regardless of the change in the angle of the vision sensor, wherein the AR object is rotated based on the at least one anchor point; and
     display the AR object corresponding to a second angle different from the first angle, in response to the rotation of the AR object.

6. The electronic device of claim 5,
   wherein each of the first input and the second input further includes at least one of an eye gaze tracking result, a gesture, a voice, or a touch input, and
   wherein the first input and the second input include different types of inputs from each other.

7. The electronic device of claim 5,
   wherein the at least one anchor point is determined by the first gesture of bringing a user's body part into contact with a space occupied by a virtual Augmented Reality object, and
   wherein the operation moves or rotates the AR object as the at least one anchor point is moved or rotated by the second gesture.

8. The electronic device of claim 5,
   wherein the first input includes maintenance of an eye gaze at a specific point of an image for a predetermined time or longer, wherein the second input includes a touch input,
wherein the at least one anchor point designates the specific point, and
wherein the operation modifies the image, based on the specific point.

9. The electronic device of claim 5,
wherein the first input includes maintenance of an eye gaze at a specific point of an image for a predetermined time or longer,
wherein the at least one anchor point designates the specific point, and
wherein the operation rotates the image, based on the specific point according to the head rotation.

10. The electronic device of claim 5,
wherein the first input includes an eye gaze at a specific point of a preview image of an image acquired through a camera,
wherein the second input includes maintenance of the eye gaze at the specific point for a predetermined time or longer,
wherein the at least one anchor point designates the specific point, and
wherein the operation controls a focal distance of the camera, based on the specific point.

11. The electronic device of claim 5,
wherein the first input includes maintenance of an eye gaze of a user at a part of a virtual Augmented Reality object corresponding to an object in a real space generated by the eye gaze of the user at the object in the real space for a predetermined time or longer,
wherein the at least one anchor point designates the part, and
wherein the operation controls attributes of the part to be a value indicated by the head rotation.

12. The electronic device of claim 5,
wherein the first input includes at least one of an eye gaze of a user at a virtual object within a Virtual Reality (VR) space or a voice command,
wherein the at least one anchor point designates the virtual object, and
wherein the operation moves a viewpoint within the VR space, based on the virtual object.

13. The electronic device of claim 5,
wherein the first input includes at least one of an eye gaze of a user at a location within a Virtual Reality (VR) space or a voice command,
wherein the at least one anchor point designates the location, and
wherein the operation includes insertion of an object into the location.

14. The electronic device of claim 5,
wherein the first input includes at least one of an eye gaze of a user at an object within a Virtual Reality (VR) space or a voice command,
wherein the at least one anchor point designates the object, and
wherein the operation moves the object within the VR space.

15. The electronic device of claim 5, wherein the at least one anchor point includes one of an object displayed on the electronic device or one point on the object.

16. The electronic device of claim 5, wherein an object includes one of a content, attributes of the content, an application, a parameter related to the application, or an element of the electronic device.

17. The electronic device of claim 5, wherein the processor is further configured to:
  detect a characteristic of an object in a real space based on an image of the object captured by a camera, the characteristic comprising an object type.

18. The electronic device of claim 17, wherein the object type comprises one of a person, a dog, a cat, or a flower.

\* \* \* \* \*